(12) United States Patent
Matsutani

(10) Patent No.: US 8,022,998 B2
(45) Date of Patent: Sep. 20, 2011

(54) IMAGING APPARATUS AND IMAGING METHOD

(75) Inventor: Atsushi Matsutani, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 476 days.

(21) Appl. No.: 12/305,862

(22) PCT Filed: Jul. 9, 2007

(86) PCT No.: PCT/JP2007/064036
§ 371 (c)(1),
(2), (4) Date: Dec. 19, 2008

(87) PCT Pub. No.: WO2008/007791
PCT Pub. Date: Jan. 17, 2008

(65) Prior Publication Data
US 2010/0110202 A1    May 6, 2010

(30) Foreign Application Priority Data

Jul. 10, 2006  (JP) ................................ 2006-189024
Jan. 16, 2007  (JP) ................................ 2007-006982

(51) Int. Cl.
*H04N 5/228* (2006.01)
*G03B 17/00* (2006.01)

(52) U.S. Cl. ............... 348/208.5; 348/208.1; 348/208.2; 348/208.4; 348/208.13; 396/55

(58) Field of Classification Search .............. 348/208.99–208.16, 208.1, 208.2, 348/208.4, 208.5, 208.13; 396/55, 50
See application file for complete search history.

(56) References Cited

U.S. PATENT DOCUMENTS

| 5,181,056 | A | 1/1993 | Noguchi et al. |
| 5,619,030 | A | 4/1997 | Shiomi |
| 6,704,501 | B1 * | 3/2004 | Washisu ......................... 396/55 |
| 7,706,672 | B2 * | 4/2010 | Matsutani ..................... 396/55 |
| 2003/0193600 | A1 * | 10/2003 | Kitamura et al. ........ 348/333.01 |

(Continued)

FOREIGN PATENT DOCUMENTS

EP    0 540 046 A2    5/1993
(Continued)

*Primary Examiner* — Lin Ye
*Assistant Examiner* — Marly Camargo
(74) *Attorney, Agent, or Firm* — Oblon, Spivak, McClelland, Maier & Neustadt, L.L.P.

(57) ABSTRACT

Exposed images from a CCD are each captured to Surfaces A, B and C in an SDRAM in a repeated sequence from A, B to C, and the latest image among the images thus captured is displayed. While an image on Surface B is being transferred, an image on Surface A is used as the image to be displayed. The next exposure is started, and images to be displayed are switched, at the same timing as the transfer is started. An image to be displayed on an LCD monitor is stopped from being updated when camera shake compensating device starts to be released from the mechanical holding. The next switching of images and the transfer of an exposed image from the CCD to the SDRAM are prohibited. When the release of the mechanical holding is completed, the next exposed image is transferred from the CCD to the SDARM. Updating is permitted for displaying the image which is transferred to the SDRAM on a display device. A conversion is made from the mechanical holding to the electrical holding without causing a sense of inconvenience due to a blur of an image or the like to be displayed when the holding is released.

17 Claims, 28 Drawing Sheets

U.S. PATENT DOCUMENTS

| | | |
|---|---|---|
| 2007/0091181 A1 | 4/2007 | Serikawa et al. |
| 2007/0154195 A1 | 7/2007 | Irisawa et al. |
| 2008/0151066 A1 | 6/2008 | Serikawa |

FOREIGN PATENT DOCUMENTS

| | | |
|---|---|---|
| EP | 0 540 046 A3 | 5/1993 |
| JP | 5 22649 | 1/1993 |
| JP | 5-150194 | 6/1993 |
| JP | 10-232418 | 9/1998 |
| JP | 10-339892 | 12/1998 |
| JP | 2001 66655 | 3/2001 |
| JP | 3188739 | 5/2001 |
| JP | 2001-160958 | 6/2001 |
| JP | 2003 289469 | 10/2003 |
| JP | 2004 271693 | 9/2004 |
| JP | 2004-271693 A * | 9/2004 |
| JP | 2004 274242 | 9/2004 |
| JP | 2005 175796 | 6/2005 |
| JP | 2006 245642 | 9/2006 |
| JP | 2006 285073 | 10/2006 |
| JP | 2007 43584 | 2/2007 |
| JP | 2007 94320 | 4/2007 |
| JP | 2007 94321 | 4/2007 |
| JP | 2007 102062 | 4/2007 |
| JP | 2007 110516 | 4/2007 |
| JP | 2007 114485 | 5/2007 |
| JP | 2007 114486 | 5/2007 |
| JP | 2007 129700 | 5/2007 |
| JP | 2007 249071 | 9/2007 |
| JP | 2007 274666 | 10/2007 |
| JP | 2008 17077 | 1/2008 |
| JP | 2008 51888 | 3/2008 |
| JP | 2008 51927 | 3/2008 |
| JP | 2008 145310 | 6/2008 |
| JP | 2008 151888 | 7/2008 |

* cited by examiner

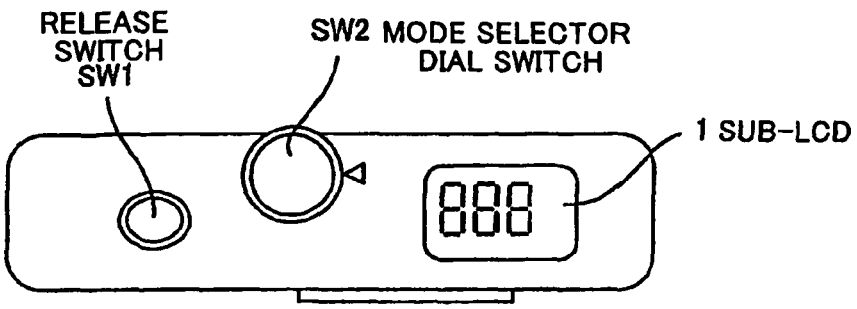
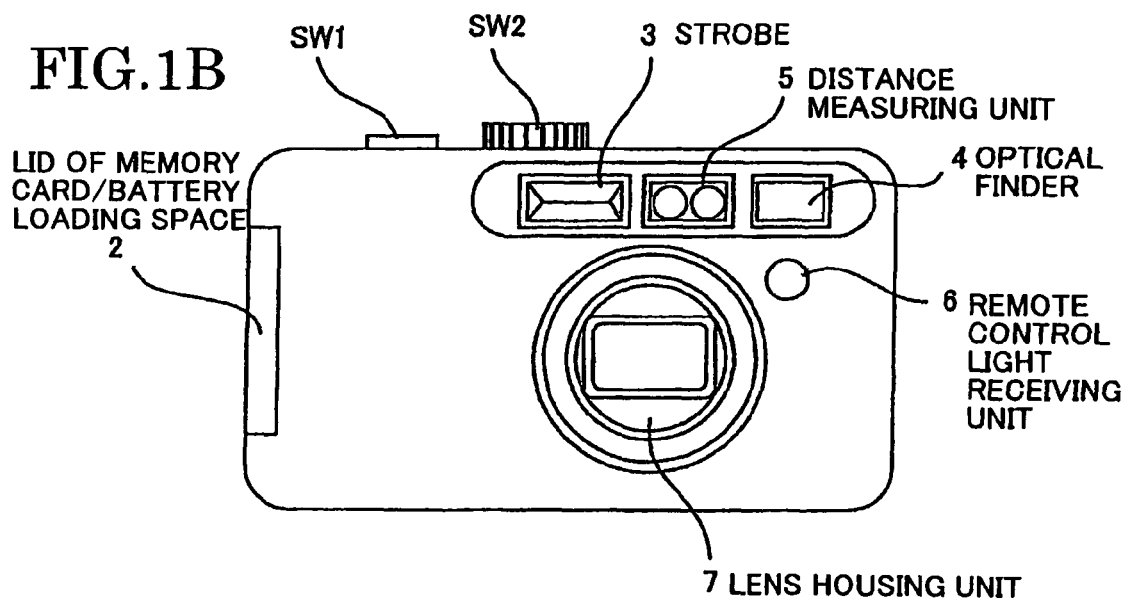
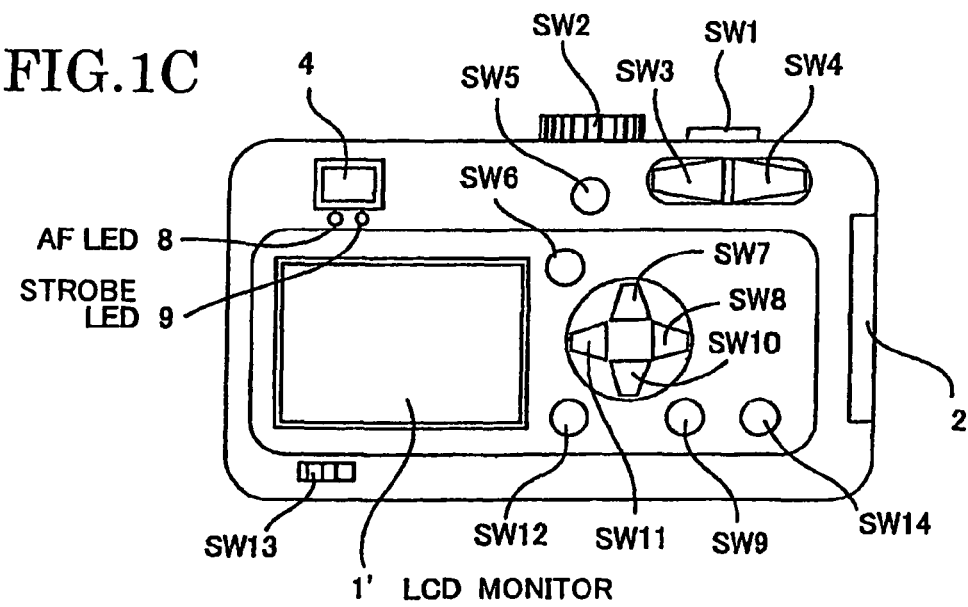

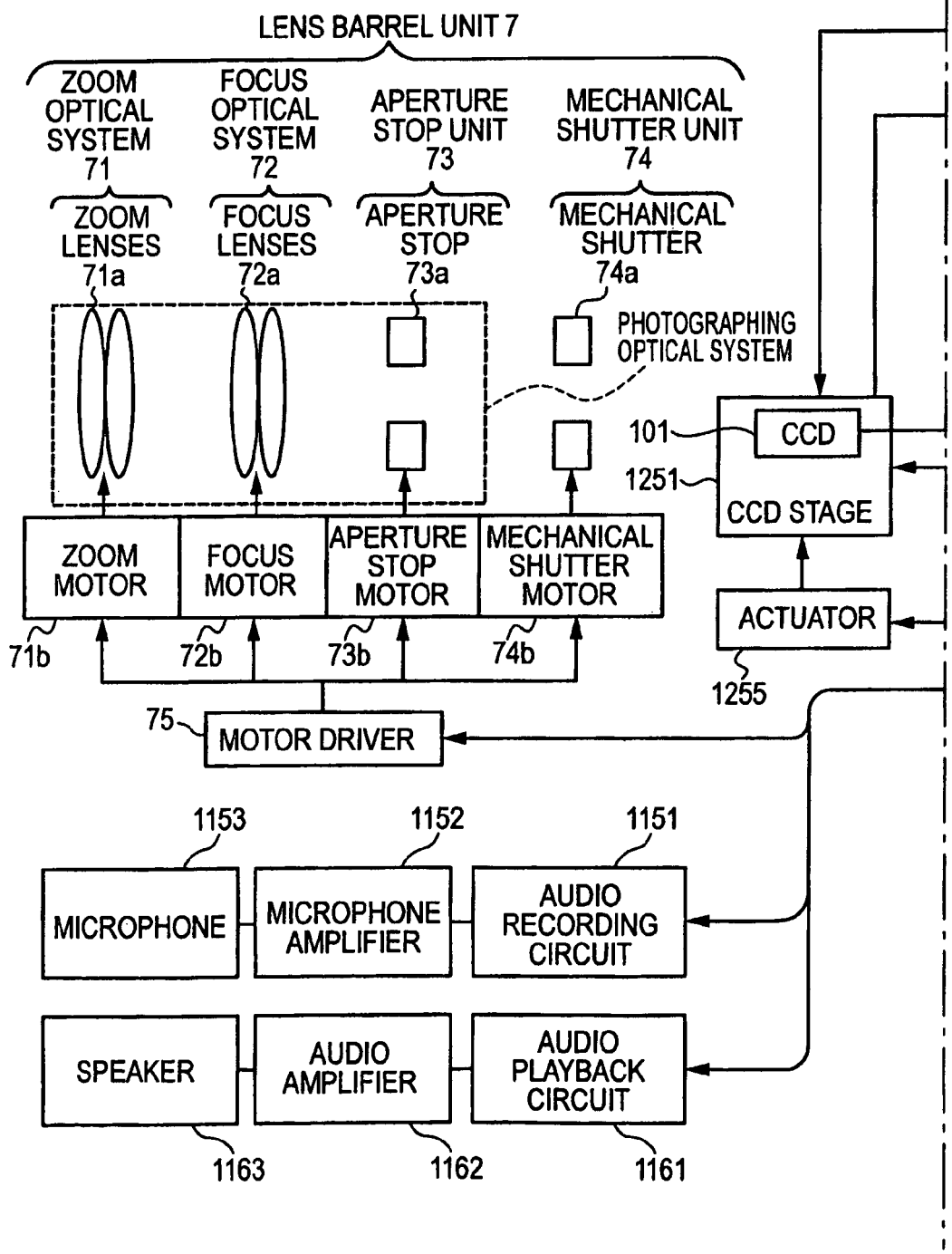

FIG.6
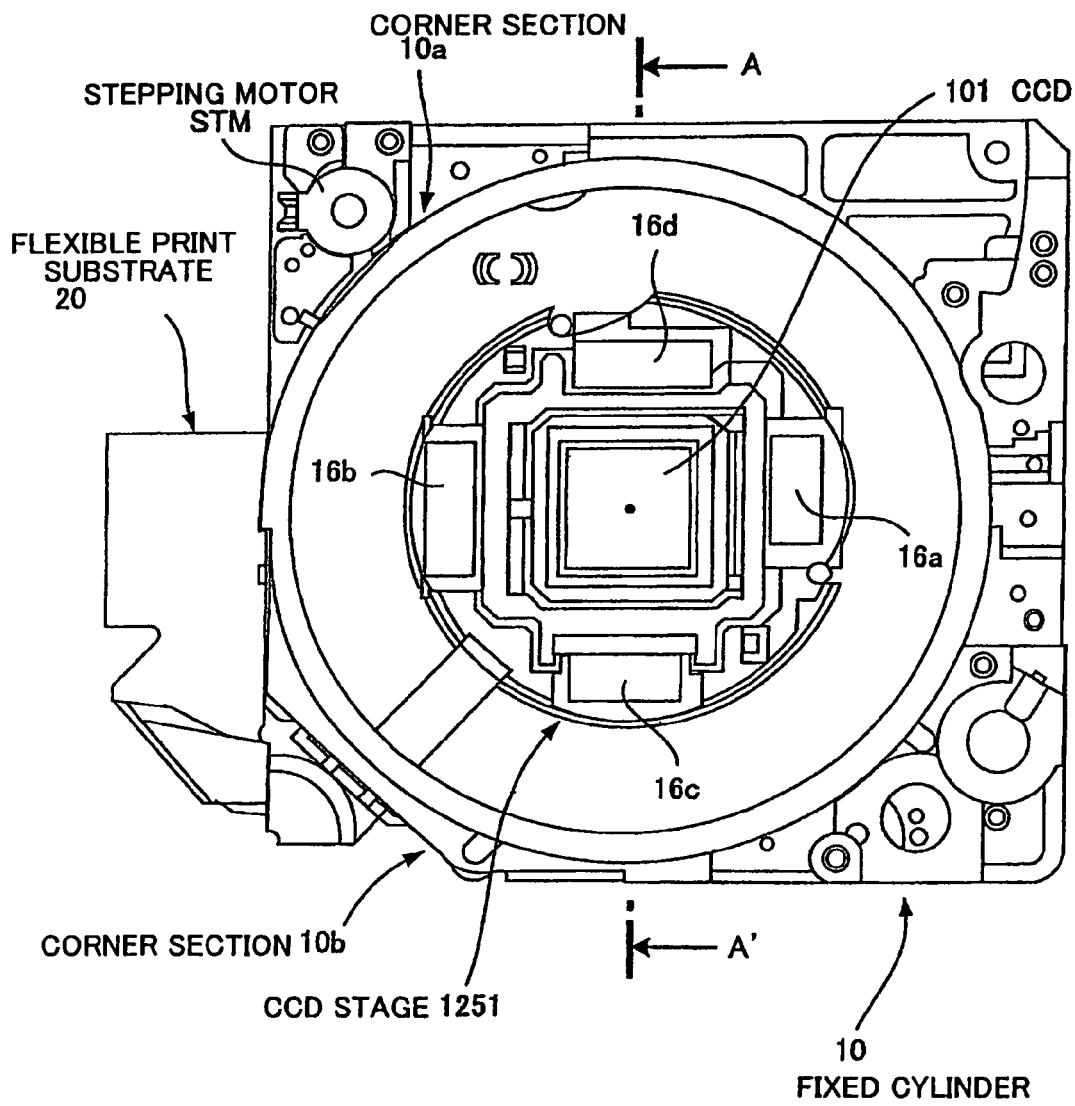
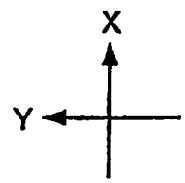

IMAGING APPARATUS AND IMAGING METHOD

TECHNICAL FIELD

The present invention relates to an imaging apparatus including a compensating function for compensating image blur due to shake of the apparatus in taking a picture, and to an imaging method of the imaging apparatus.

BACKGROUND ART

Recent years, imaging devices for still cameras, video cameras and the like have been increasingly automated, and cameras each including an automatic exposure adjusting mechanism, an automatic focus adjusting mechanism and the like are widely in practical use. As a trend toward developing multi-function cameras, several techniques have been also in practical use for implementing a compensating function for compensating an image blur which occurs due to shake of the camera as a whole.

In general, an image blur preventing apparatus including a compensating function is provided with a shake detecting device, an optical compensating device, a driving device, a controlling device, and a holding device. The shake detecting device detects shake of the apparatus as a whole. The optical compensating device compensates an image blur which occurs due to the apparatus shake. The driving device drives the optical compensating device. The controlling device controls the driving device by calculating an amount of compensation of the image blur depending on an output from the shake detecting device. The holding device mechanically holds the optical compensating device in a predetermined position.

For example, Japanese Patent Application Publication No. 2001-066655 discloses that, first, an amount of shake of an imaging apparatus due to the apparatus shake is detected. Then, an amount of displacement of a substrate including a photoelectric converting device is detected while the substrate including the photoelectric converting device is being displaced in response to the detected amount of shake. The amount of shake is compensated in response to the detected amount of displacement, and thus the substrate including the photoelectric converting device is displaced, and thereby, the apparatus shake is compensated.

Japanese Registration Patent No. 3188739 discloses that an imaging apparatus is provided with a mechanical holding device and an electrical holding device. The mechanical holding device mechanically holds an optical compensating device in a predetermined position. The electrical holding device is designed to operate when the mechanical holding device is converted from one state to another state, and holds the optical compensating device in a predetermined position. When the mechanical holding device is converted to a state in which the mechanical holding device holds the optical compensating device, the electrical holding device is operated so that the mechanical holding device is possible to hold the optical compensating device. In addition, when the mechanical holding device is converted to a state in which the mechanical holding device releases the optical compensating device from being held thereby, the electrical holding device is operated so that the mechanical holding device causes the optical compensating device not to move from the predetermined position.

In this respect, in the electrical holding state, the optical compensating device may be continuously held in the predetermined position while the driving device is being electrified. The mechanical holding device may continuously hold the optical compensating device in the predetermined position even though the driving device is not electrified. It is to be noted that the mechanical holding device includes not only a mechanical holding device involving no electrical control at all, but also a mechanical holding device involving an electrical control when the mechanical holding device is converted to the state in which the mechanical holding device holds the optical compensating device in the predetermined position, or when the mechanical holding device is converted to the state in which the mechanical holding device releases the optical compensating device from being held thereby.

DISCLOSURE OF THE INVENTION

Even the image blur preventing apparatus thus configured nevertheless has a problem that, while the mechanical holding is being converted to the electrical holding, the performing of the mechanical holding while performing the electrical holding shifts an image.

For the foregoing reasons, there is a need for an imaging apparatus including an image blur compensating function, and an imaging method including an image blur compensating step, the function and step making a compensating device capable of being converted from a mechanical holding to an electrical holding without causing inconvenience such as an image blur, an image shift or the like.

The present invention is directed to an imaging apparatus and an imaging method that satisfy this need.

To achieve these and other advantages and in accordance with the purpose of the invention, as embodied and broadly described herein, the invention provides an imaging apparatus, which comprises: an imaging device configured to capture an image; a display device configured to display the image captured by the imaging device; a shake detecting device configured to detect shake applied to the imaging apparatus; a compensating device configured to compensate an image blur caused by the shake; a driving device configured to drive the compensating device; a mechanical holding device configured to mechanically hold the compensating device; and a controller configured to mechanically hold the compensating device by the mechanical holding device while no operation for compensation of the image blur is performed, configured to electrically hold the compensating device by the driving device with a state in which the compensating device is drivable by the driving device while the operation for the compensation of the image blur is performed, and configured to change control of displaying of the image by the display device when a state in which the compensating device is mechanically held by the mechanical holding device as a mechanically holding state is converted to a state in which the compensating device is electrically held by the driving device as an electrical holding state.

Advantageously, the controller is configured to temporarily stop updating operation of the image by the display device when the mechanically holding state is converted to the electrical holding state in which the operation for the compensation of the image blur is possible.

Advantageously, timing at which the controller causes the display device to stop the updating operation of the image, when the mechanically holding state is converted to the electrical holding state in which the operation for the compensation of the image blur is possible, is a point at which a predetermined length of time has passed after control for releasing the mechanical holding state is started.

Advantageously, timing at which the controller causes the display device to resume the updating operation of the image after stopping the updating operation of the image, when the mechanically holding state is converted to the electrical holding state in which the operation for the compensation of the image blur is possible, is a point at which a predetermined length of time has passed after control for releasing the mechanical holding state is completed.

Advantageously, the controller is configured to release holding of the compensating device by the mechanical holding device when a power supply to the imaging apparatus is turned on.

Advantageously, the controller is configured to release holding of the compensating device by the mechanical holding device when a first release operation starts to be performed.

Advantageously, the holding of the compensating device by the mechanical holding device is released when a second release operation starts to be performed.

Advantageously, the controller is configured to cover the displaying of the image by the display device with on-screen display (OSD) when the mechanically holding state is converted to the electrical holding state in which the operation for the compensation of the image blur is possible.

In addition, the present invention provides an imaging method, which comprises: preparing an imaging device configured to capture an image; preparing a display device configured to display the image captured by the imaging device; preparing a shake detecting device configured to detect shake applied externally; preparing a compensating device configured to compensate an image blur caused by the shake; preparing a driving device configured to drive the compensating device; preparing a mechanical holding device configured to mechanically hold the compensating device; mechanically holding the compensating device by the mechanical holding device while no operation for compensation of the image blur is performed; electrically holding the compensating device by the driving device with a state in which the compensating device is drivable by the driving device while the operation for the compensation of the image blur is performed; and changing control of displaying of the image by the display device when a state in which the compensating device is mechanically held by the mechanical holding device as a mechanically holding state is converted to a state in which the compensating device is electrically held by the driving device as an electrical holding state.

Advantageously, the method further comprises temporarily stopping updating operation of the image by the display device when the mechanically holding state is converted to the electrical holding state in which the operation for the compensation of the image blur is possible.

Advantageously, timing at which to cause the display device to stop the updating operation of the image, when the mechanically holding state is converted to the electrical holding state in which the operation for the compensation of the image blur is possible, is a point at which a predetermined length of time has passed after control for releasing the mechanical holding state is started.

Advantageously, timing at which to cause the display device to resume the updating operation of the image after stopping the updating operation of the image, when the mechanically holding state is converted to the electrical holding state in which the operation for the compensation of the image blur is possible, is a point at which a predetermined length of time has passed after control for releasing the mechanical holding state is completed.

Advantageously, the method further comprises releasing holding of the compensating device by the mechanical holding device when a power supply to the imaging apparatus is turned on.

Advantageously, the method further comprises releasing holding of the compensating device by the mechanical holding device when a first release operation starts to be performed.

Advantageously, the method further comprises releasing the holding of the compensating device by the mechanical holding device when a second release operation starts to be performed.

Advantageously, the method further comprises covering the displaying of the image by the display device with on-screen display (OSD) when the mechanically holding state is converted to the electrical holding state in which the operation for the compensation of the image blur is possible.

Moreover, the invention provides an imaging apparatus, which comprises: imaging means; display means for displaying an image from the imaging means; shake detecting means for detecting shake applied to the imaging apparatus; compensating means for compensating an image blur caused by the shake; driving means for driving the compensating means; and mechanical holding means for mechanically holding the compensating means, the imaging apparatus including an image blur compensating function which mechanically holds the compensating means while no operation for compensation of the image blur is performed, and which electrically holds the compensating means with a state in which the compensating means is drivable while the operation for the compensation of the image blur is performed, wherein the imaging apparatus comprises means for changing control of displaying by the display means when a state in which the compensating means is mechanically held as a mechanically holding state is converted to a state in which the compensating means is electrically held as an electrical holding state.

Therefore, the present invention brings about an effect of making it possible to smoothly convert the compensating device which compensates the image blur between the mechanical holding and the electrical holding without the image blur, image shift or the like making a user of the imaging apparatus feel a sense of inconvenience.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this description. The drawings illustrate embodiments of the invention and, together with the description, serve to explain the principles of the invention.

FIG. 1A is a top view illustrating an appearance of a digital still camera according to an embodiment of the present invention.

FIG. 1B is a front view illustrating the appearance of the digital still camera according to the embodiment of the present invention.

FIG. 1C is a back view illustrating an appearance of the digital still camera according to the embodiment of the present invention.

FIG. 6 is a front view illustrating a fixed cylinder of a lens barrel unit of the digital camera.

DESCRIPTION OF NUMERALS

Figure 2B:
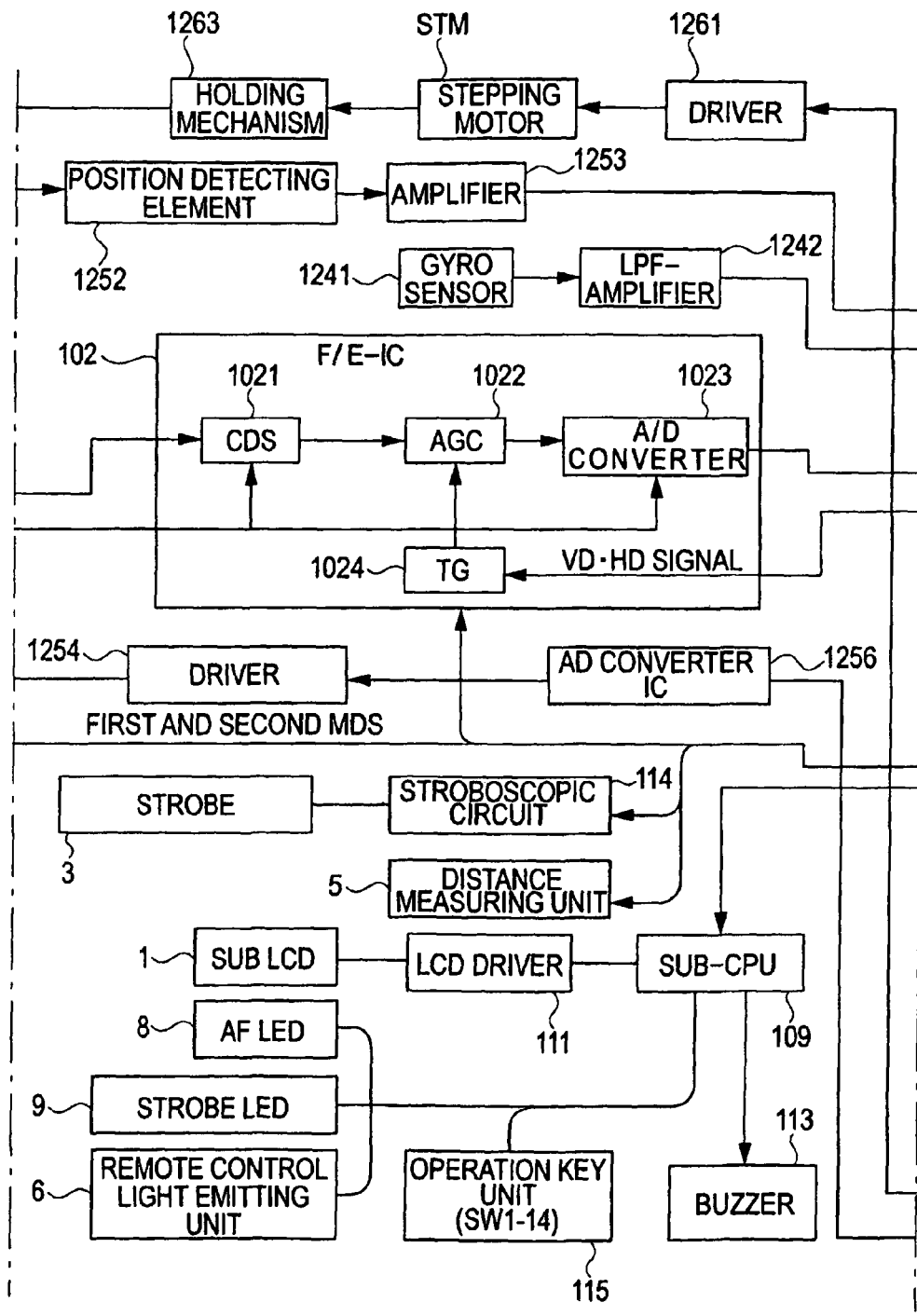
FIG. 2 is a block circuit diagram illustrating a schematic of a system configuration inside the digital camera.

1' LCD monitor
7 lens barrel unit
101 CCD
102 F/E-IC
103 SDRAM
109 sub-CPU
117 LCD driver
1251 CCD stage
1041 first CCD signal process block
1043 CPU block
1049 TV signal display block
SW1 to 14 operation keys

BEST MODE FOR CARRYING OUT THE INVENTION

Reference will now be made in detail to the present preferred embodiments of the present invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

Note that the present embodiment of the invention compensates or suppresses image blur caused by shake of an apparatus; the shake of the apparatus may be caused by hands of an operator holding the apparatus. However, the invention is not limited only by the image blur caused by the shake of the apparatus held by hands.

Figure 2C:
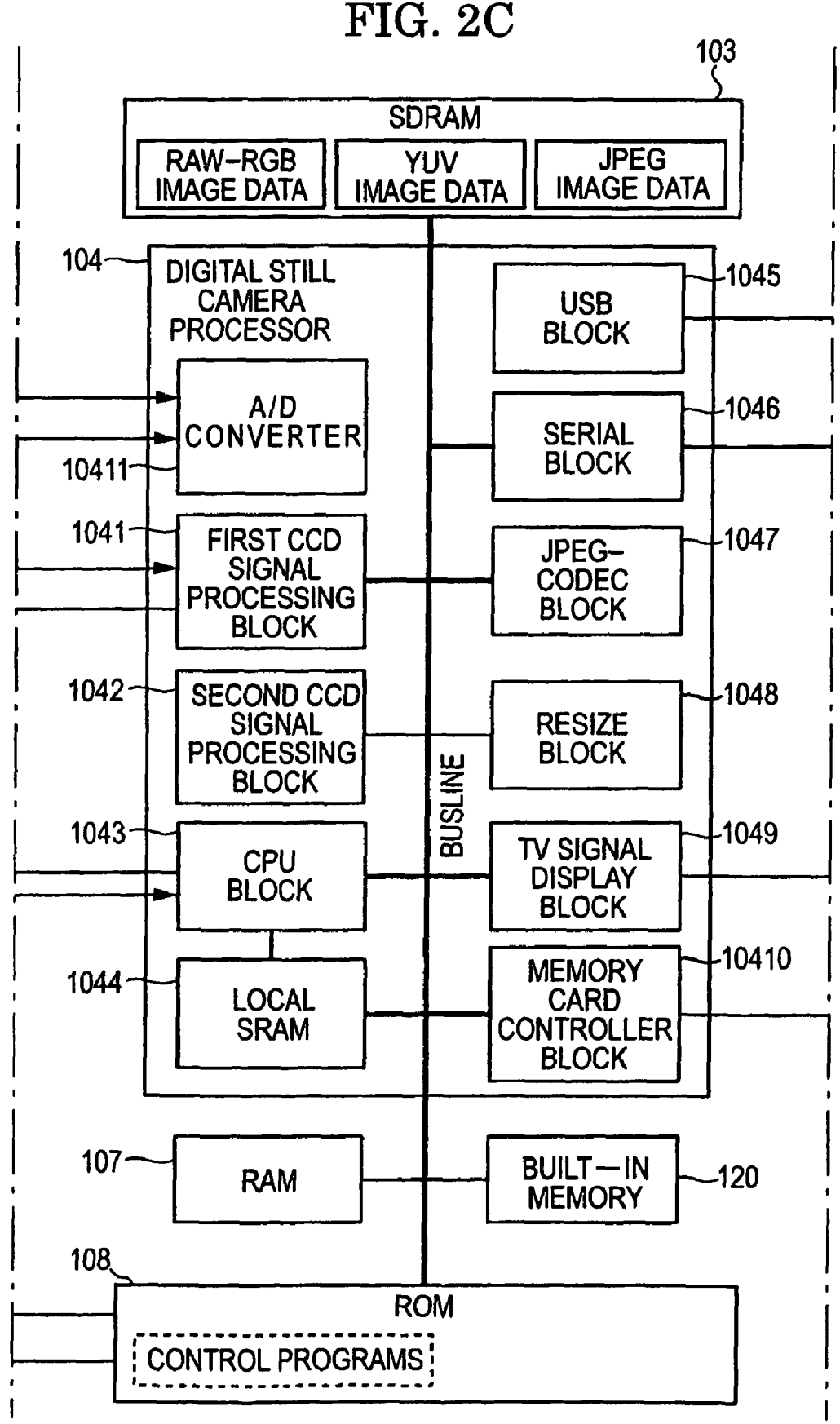
Figure 2D:
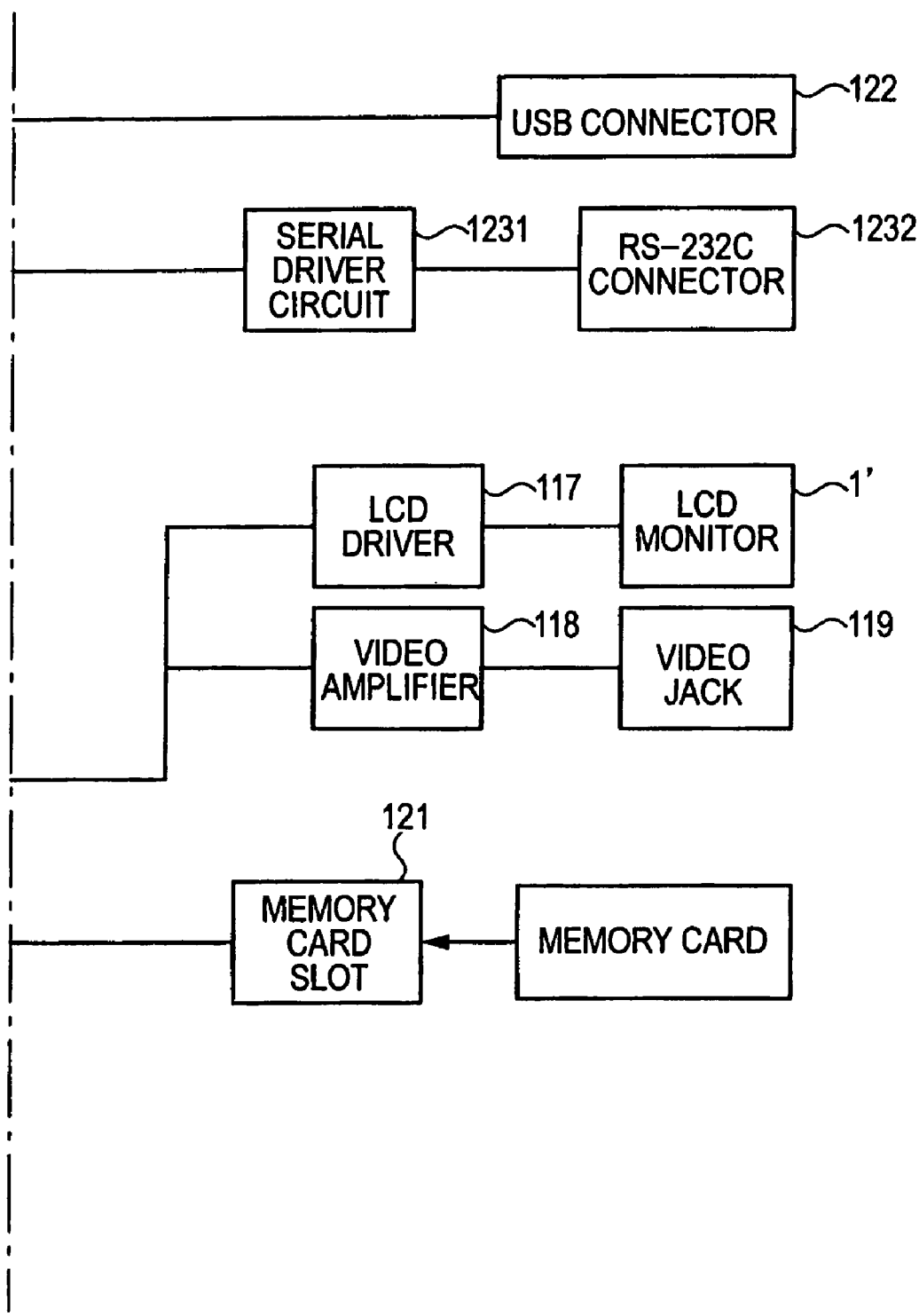

FIGS. 1A to 1C each illustrates an appearance of a digital still camera (hereinafter simply referred to as a "digital camera") according to an embodiment of the present invention, wherein FIG. 1A, FIG. 1B and FIG. 1C are respectively a top view, front view and back view of the digital camera. In addition, FIG. 2 is a block circuit diagram illustrating a schematic of a system configuration inside the digital camera.

As illustrated in FIGS. 1A to 1C, a release switch (release shutter) SW1, a mode selector dial switch SW2 and a sub-LCD (Liquid Crystal Display) 1 are arranged on the top of the digital camera main body.

The front of the digital camera main body is provided with: a lens barrel unit 7 including image-taking lenses; an optical finder 4; a strobe light emitting unit 3; a distance measuring unit 5; and a remote control light receiving unit 6.

The back of the digital camera is provided with a power supply switch SW13, an LCD monitor 1', an AFLED (Auto-Focus Light-Emitting Diode) 8, a strobe LED 9, a wide-angle direction zoom switch SW3, a long-focus direction zoom switch SW4, a self-timer switch SW5 for setting and canceling a self-timer, a menu selector switch SW6, an upward movement•strobe setting switch SW7, a rightward movement switch SW8, a display switch SW9, a downward movement•micro-switch SW10, a leftward movement•image checking switch SW11, an OK switch SW12, and an image blur compensation switch SW14. A side of the camera main body is provided with a lid of memory card/battery loading space.

Because functions and effects of the members of the digital camera are well-known, the description of them will not be described in detail. Descriptions will be provided next for a system configuration inside the camera on the basis of FIG. 2 with reference to FIGS. 1A to 1C.

As illustrated in FIG. 2, reference numeral 104 denotes a digital still camera processor (hereinafter simply refer to as a "processor"). This digital still camera processor 104 includes an A/D (Analog/Digital) converter 10411, a first CCD (Charge-Coupled Device) signal processing block 1041, a second CCD signal processing block 1042, a CPU (Central Processing Unit) block 1043, a local SRAM (Static Random Access Memory) 1044, a USB (Universal Serial Bus) block 1045, a serial block 1046, a JPEG•CODEC (Coder/Decoder) block (a block for JPEG compression and decompression) 1047, a RESIZE block (a block for enlarging and reducing an image data size through an interpolation process) 1048, a TV signal display block (a block for converting image data to a video signal for displaying the image data on an external display such as a liquid crystal monitor and a TV) 1049, and a memory card controller block (a block for controlling a memory card in which to record data on a photographed image) 10410. These blocks are connected to one another with a bus line.

An SDRAM (Synchronous Dynamic Random Access Memory) 103 in which to save RAW-RGB image data (image data whose white balance and gamma are adjusted), YUV image data (image data which has been converted to brightness data and color difference data) and JPEG image data (image data compressed using JPEG compression) is arranged outside the processor 104. This SDRAM 103 is connected to the processor 104 via a memory controller (not illustrated) and the bus line.

In addition, a RAM 107, a built-in memory (a memory in which to store data on a photographed image even in a case where no memory card is loaded in the memory card slot) 120 and a ROM 108 in which control programs, parameters and the like are stored are provided outside the processor 104. These memories are connected to the processor 104 with the bus line.

The control programs to be stored in the ROM 108 are loaded in a main memory (not illustrated) in the processor 104 once the power supply switch SW13 of the digital camera is turned on. In accordance with the control programs, the processor 104 controls operations of the respective units, and temporarily stores control data, parameters and the like in the RAM 107.

The lens barrel unit 7 is provided with a lens cylinder including: a zoom optical system 71 having zoom lenses 71a; a focus optical system 72 having focus lenses 72a; an aperture stop unit 73 including an aperture stop 73a; and a mechanical shutter unit 74 having a mechanical shutter 74a. It should be noted that the zoom lenses 71a, the focus lenses 72a and the aperture stop 73a constitute a photographing optical system. In addition, the optical axis of the photographing optical system is defined as the z-axis, and the plane orthogonal to the z-axis is defined as the X-Y plane.

The zoom optical system 71, the focus optical system 72, the aperture stop unit 73 and the mechanical shutter unit 74 are driven respectively by a zoom motor 71b, a focus motor 72b, an aperture stop motor 73b and a mechanical shutter motor 74b.

The motors in this lens barrel unit 7 are driven by a motor driver 75. The motor driver 75 is controlled by the CPU block 1043 in the processor 104.

In addition, the lens system in the lens barrel unit 7 forms an image of an object on a CCD (Charge-Coupled Device) 101. The CCD 101 converts the image of the object to an image signal, and thus outputs the image signal to an F/E (Front/End)-IC 102. The F/E-IC 102 includes: a CDS (Correlated Double Sampling) portion 1021 for performing correlated double sampling for the purpose of reducing image noise; an AGC (Automatic Gain Control) portion 1022 for gain control; and an A/D converter 1023 for performing an analog-to-digital conversion. Specifically, the F/E-IC 102 applies a predetermined process to the image signal, and thus converts an analog image signal to a digital signal, hence outputting this digital signal to the first CCD signal process block 1041 in the process 104.

These signal control processes are performed by use of VD (vertical synchronization)-HD (horizontal synchronization) signal outputted from the first CCD signal processing block 1041 in the processor 104 via a TG (Timing Generator) 1024. The TG 1024 generates a drive timing signal on the basis of the VD-HD signal.

The CPU block 1043 in the processor 104 controls an audio recording operation which an audio recording circuit 1151 performs. In response to an instruction, the audio recording circuit 1151 records a signal obtained by causing a microphone AMP (amplifier) 1152 to amplify an audio recording signal which has resulted from conversion by a microphone 1153. The CPU block 1043 controls operations of an audio playback circuit 1161 as well. In accordance with an instruction, the audio playback circuit 1161 is designed to play back an audio signal which has been stored in the memory whenever necessary, to thus output the resultant audio signal to an audio AMP 1162, and to hence cause sound to be outputted from a speaker 1163.

The CPU block 1043 further controls a strobe circuit 114, and accordingly causes the strobe light emitting unit 3 to emit a flash of illumination light. In addition to this, the CPU block 1043 controls the distance measuring unit 5.

The CPU block 1043 is connected to a sub-CPU 109 of the processor 104. The sub-CPU 109 controls display of the sub-LCD (Liquid Crystal Display) 1 through an LCD driver 117. The sub-CPU 109 is further connected to the AF (Auto Focus) LED 8, the strobe LED 9, the remote control light receiving unit 6, an operation key unit configured of the operation switches SW1 to SW14, and a buzzer 113.

The USB block 1045 is connected to a USB connector 122. The serial block 1046 is connected to an RS-232C connector 1232 via a serial driver circuit 1231. The TV signal display block 1049 is connected to the LCD monitor 1' via an LCD driver 117. Concurrently, the TV signal display block 1049 is connected to a video jack (a jack with which to connect the camera to an external display such as a TV) 119 via a video AMP (an AMP (amplifier) for converting the video signal, which has been outputted from the TV signal display block 1049, to a 75-Ω impedance) 118. The memory card controller block 10410 is connected to a card contact point of a memory card slot 121.

The LCD driver 117 drives the LCD monitor 1', and concurrently plays a role in converting the video signal, which has been outputted from the TV signal display block 1049, to a signal to be displayed on the LCD monitor 1'. The LCD monitor 1' is used for the purpose of monitoring what condition an object is in before taking a picture, checking a photographed image, and displaying image data which has been recorded in the memory card or the built-in memory 120.

The digital camera main body is provided with a fixed cylinder constituting a part of the lens barrel unit 7. In this fixed cylinder, a CCD stage 1251 is provided movable in the X-Y direction. The CCD 101 is mounted on the CCD stage 1251 constituting a part of the image blur compensating mechanism. Descriptions will be provided later for detailed configurations of this fixed cylinder and the CCD stage 1251.

The CCD stage 1251 is driven by an actuator 1255. The drive of the actuator 1255 is controlled by a driver 1254. The driver 1254 includes a coil drive first MD and a coil drive second MD. This driver 1254 is connected to an AD (analog-digital) converter IC 1256, which is connected to the ROM 108. Control data is inputted from the ROM 108 to this AD converter IC 1256.

The fixed cylinder is provided with a holding mechanism 1263 for forcedly holding the CCD stage 1251 in a center position (home position) while the image blur compensation switch SW14 is off, and while the power supply switch SW13 is off. The holding mechanism 1263 is controlled by a stepping motor STM as an actuator. The stepping motor STM is driven by a driver 1261. Control data is inputted to this driver 1261 from the ROM 108.

A position detecting element 1252 is installed in the CCD stage 1251. A detection output from the position detecting element 1252 is inputted to an amplifier 1253, and is thus amplified by the amplifier 1253. The resultant detection output is inputted to the A/D converter 14011. The digital camera main body is provided with a gyro sensor 1241 in a way that the gyro sensor 1241 can detect rotations in the pitch direction and the yaw direction. A detection output from the gyro sensor 1241 is inputted to the A/D converter 10411 via an LPF-amplifier 1242 which also functions as a low-pass filter.

This digital camera includes at least two modes: a "monitoring process" block and a "playback process" block. The digital camera is converted back and forth between the two modes. Inside the "monitoring process" block, a menu can be called, and thus various settings are changeable. In addition, inside the "playback process" block, a photographed image is displayable on the LCD monitor 1'.

Figure 3:
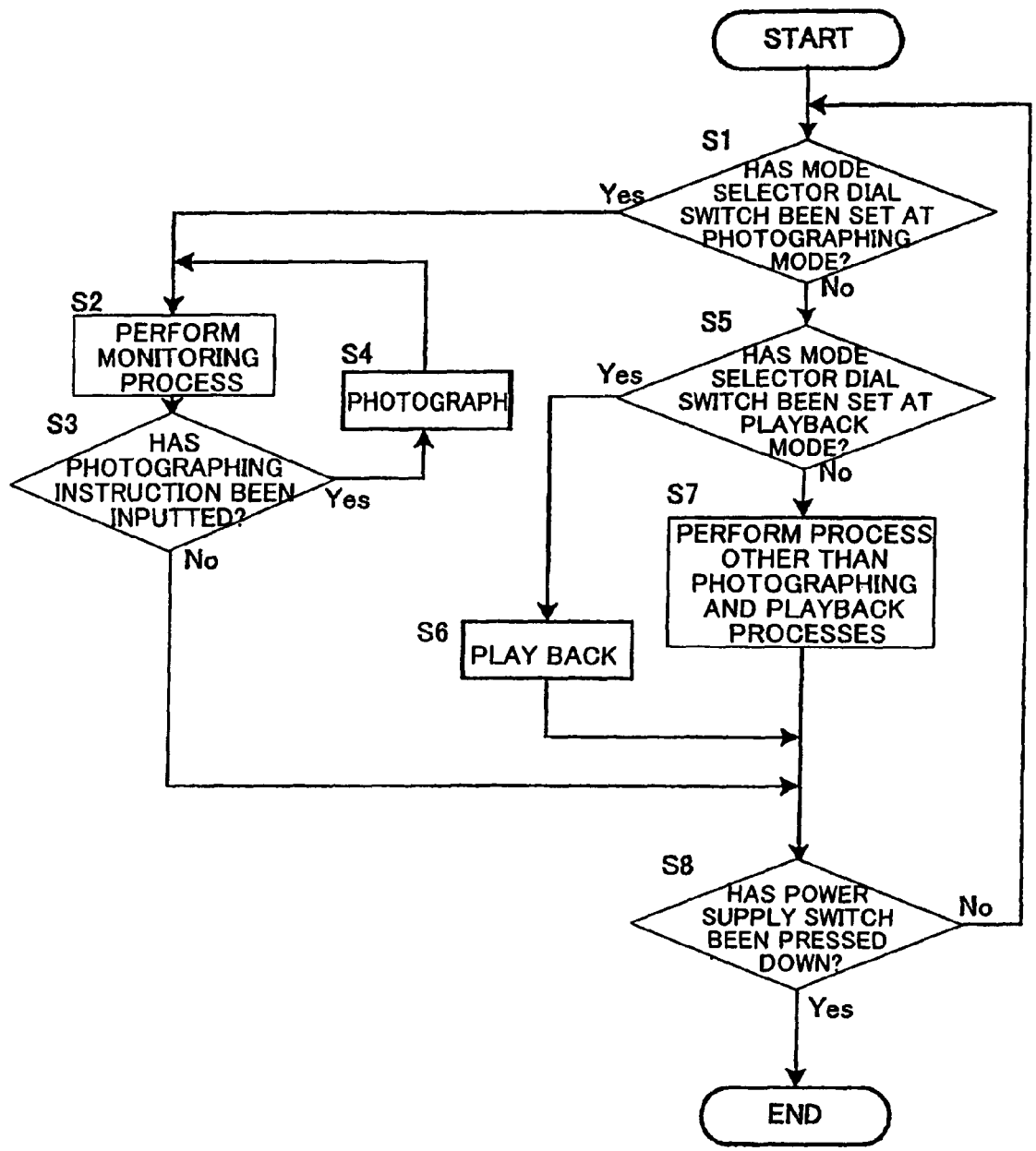
FIG. 3 is a flowchart illustrating an operational schematic of two modes of the digital camera.

Specifically, as illustrated by a flowchart in FIG. 3, it is determined whether or not the mode selector dial switch SW2 has been set at a photographing mode (in step S1). In a case where the mode selector dial switch SW2 has been set at the photographing mode (in a case of YES in step S1), a monitoring process is performed (in step S2). After the monitoring process is executed, it is determined whether or not a photographing instruction has been inputted (in step S3). In a case where the photographing instruction has been inputted (in a case of YES in the process S2), a photographing process is executed (in step S4). Thereafter, the flow returns to the process S2. In a case where a photographing instruction has not been inputted (in a case of NO in the process S2), the flow proceeds to a process S8, which will be described later.

Moreover, in a case where the mode selector dial switch SW2 has not been set at the photographing mode in the process S1 (in a case of NO in the process S1), it is further determined whether or not the mode selector dial switch SW2 has been set at a playback mode (in step S5). In a case where the mode selector dial switch SW2 has been set at the playback mode (in a case of YES in the process S5), the playback process for displaying an photographed image on the LCD monitor 1' is executed (in step S6). In a case where the mode selector dial switch SW2 has not been set at the playback mode (in a case of NO in the process S5), a process other than the photographing process and the playback process is executed (in step S7).

After the processes S3, S6 and S7, it is determined whether or not the power supply switch SW13 has been pressed down (in step S8). In a case where the power supply switch SW13 has been pressed down (in a case of YES in the process S8), the process is completed. In a case where the power supply switch SW13 has not been pressed down (in a case of NO in the process S8), the flow returns to the process S1, and the process is continued.

Figure 4A:
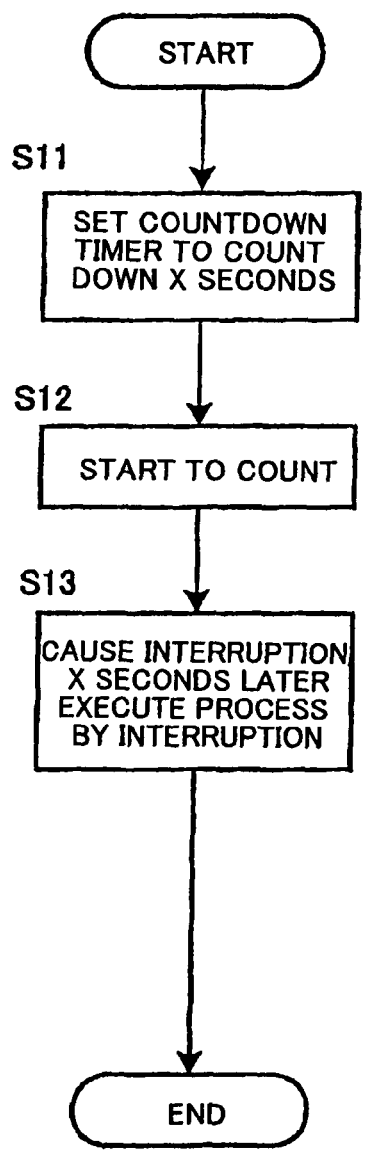
FIG. 4A illustrates operation of a timer function, in which a flowchart of a countdown timer is illustrated.
Figure 4B:
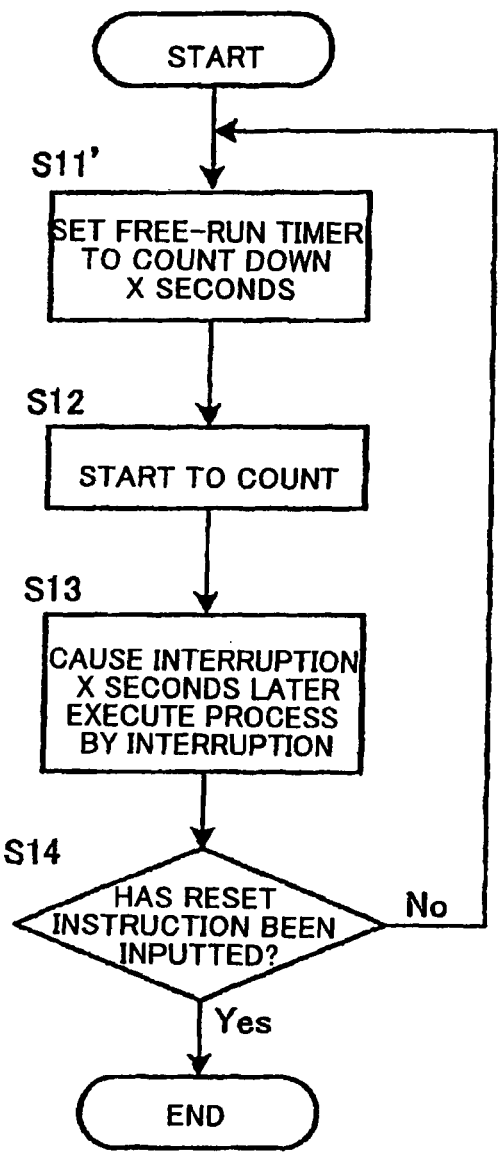
FIG. 4B illustrates operation of another timer function, in which flowchart of a free-run timer is illustrated.

The processor 104 illustrated in FIG. 2 includes two types of timer functions. FIG. 4A and FIG. 4B are flowcharts illustrating operations of the two respective types of timer functions. FIG. 4A is a flowchart for a countdown timer, and FIG. 4B is a flowchart for a free-run timer. Each of the two timers counts down seconds which has been set beforehand, and causes an interruption when the countdown reads zero second. It should be noted that the number of a second read during the countdown may be referred to by use of a register. X seconds to be counted are set in each of the two timers (in steps S11 and S11'). Subsequently, the count is started in each of the two timers (in step S12). Once the X seconds thus set has passed, a predetermined interruption process is executed (in step S13).

In this respect, the process to be performed by the countdown timer is designed to be terminated once one round of the countdown operation completes. The countdown timer needs to be started once again in order to activate the countdown timer again. The process to be performed by the free-run timer is as follows. It is checked on whether or not a reset instruction has been inputted (in step S14). In a case where no reset instruction has been inputted (in a case of NO in the process S14), the flow returns to the process S1. In a case where a reset instruction has been inputted (in a case of YES in step S14), the countdown process is terminated. Until a reset instruction is executed, the free-run timer repeats executing an interruption at intervals of the X seconds.

Figure 5:
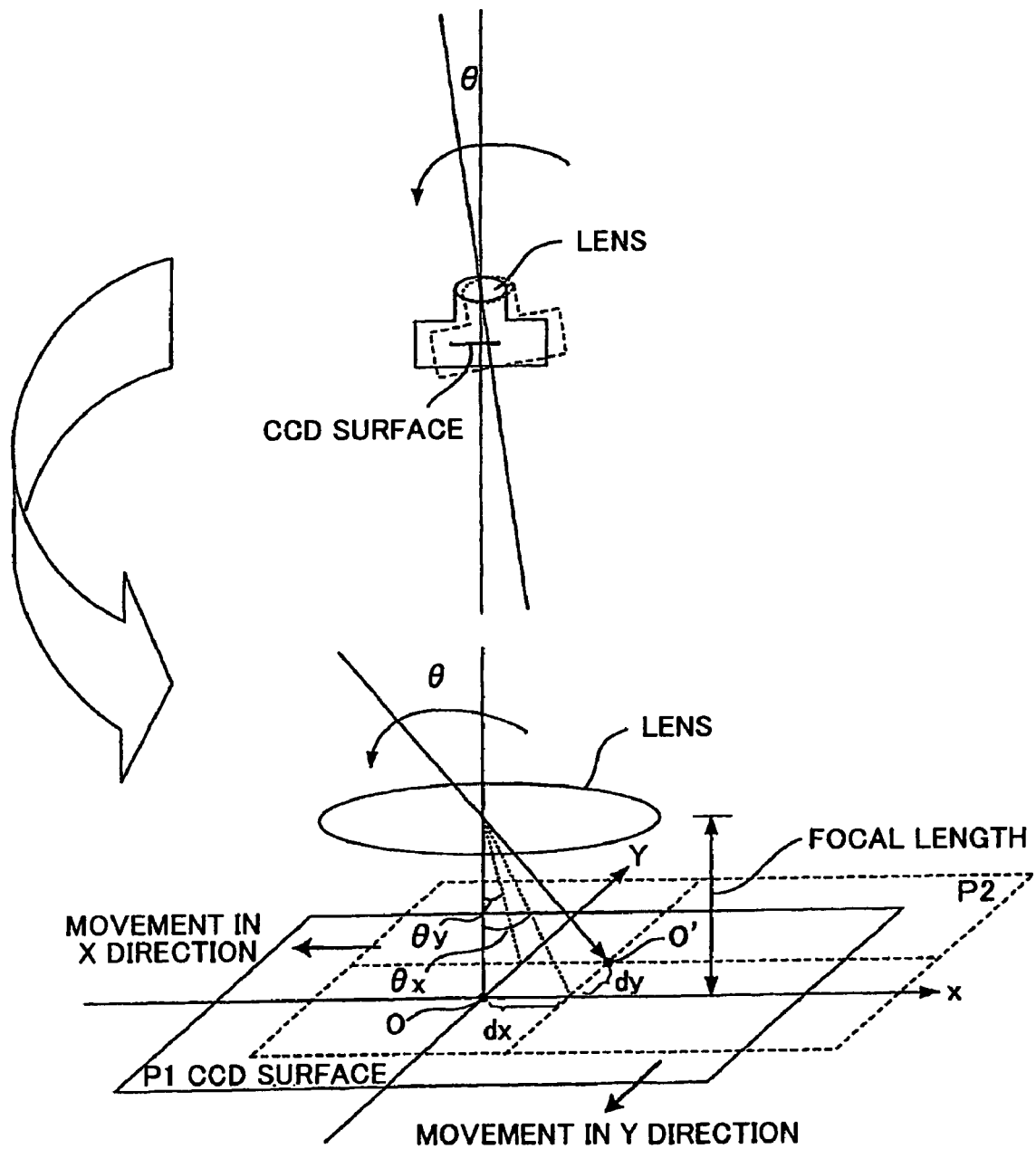
FIG. 5 is a diagram illustrating a principle with which to perform image blur compensation.

FIG. 5 illustrates a principle with which to perform compensation of image blur due to camera shake, by sliding the CCD. When an imaging surface (a CDD surface) is situated at a position P1, an image of an object is projected to a point O. In a case where, however, the camera rotates by angles of θx and θy due to shake of the camera, the imaging surface moves to a position P2, and thus a position on which to image the object moves to a point O'. For this reason, the returning of the imaging surface to the position P1 through parallel movement by distances of dx and dy makes it possible to make a point to which to project the object the same as the point O in the imaging surface situated at the position P1.

Figure 7:
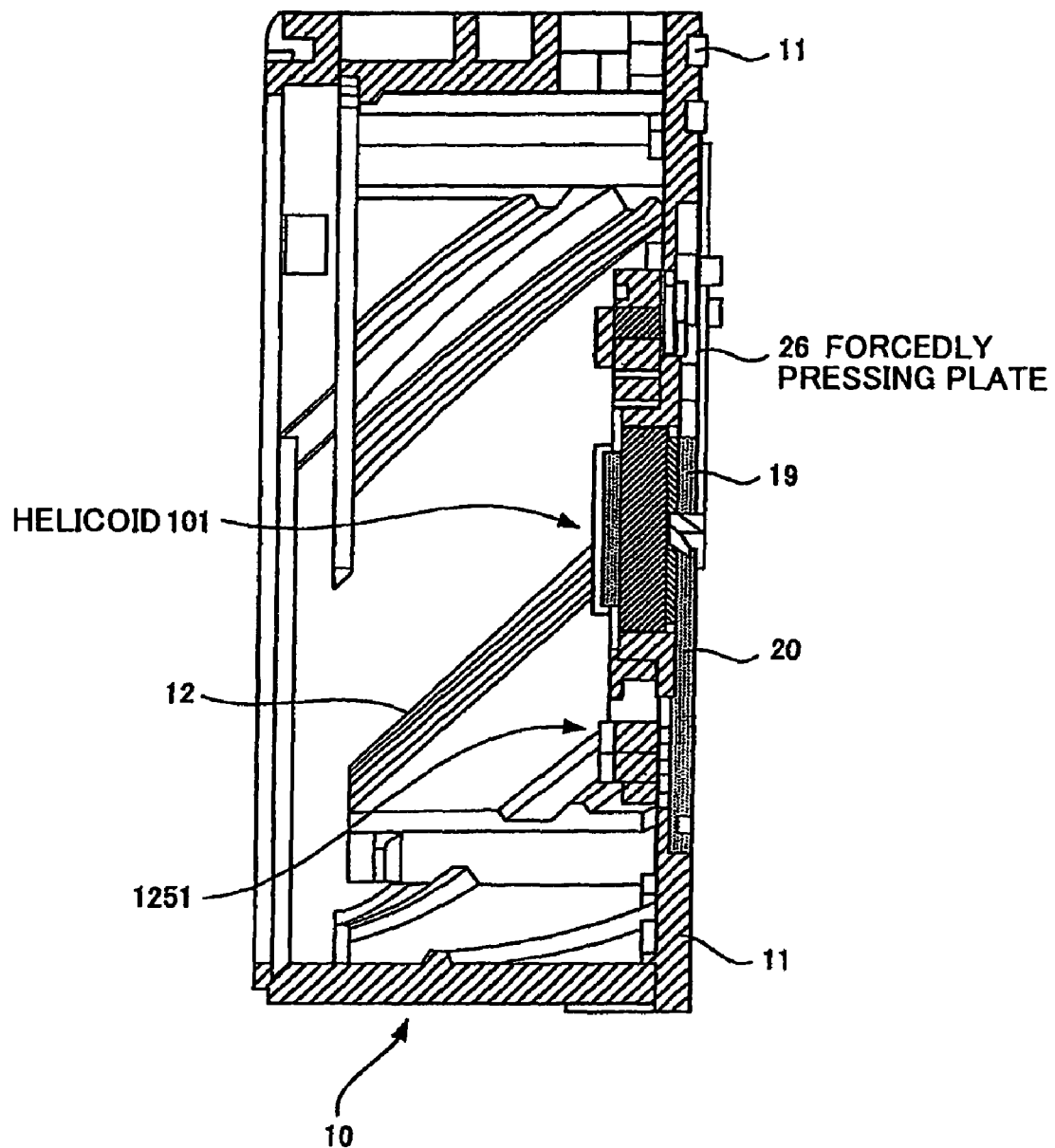
FIG. 7 is a longitudinal cross-sectional view of the fixed cylinder taken along the A-A' line of FIG. 6.
Figure 8A:
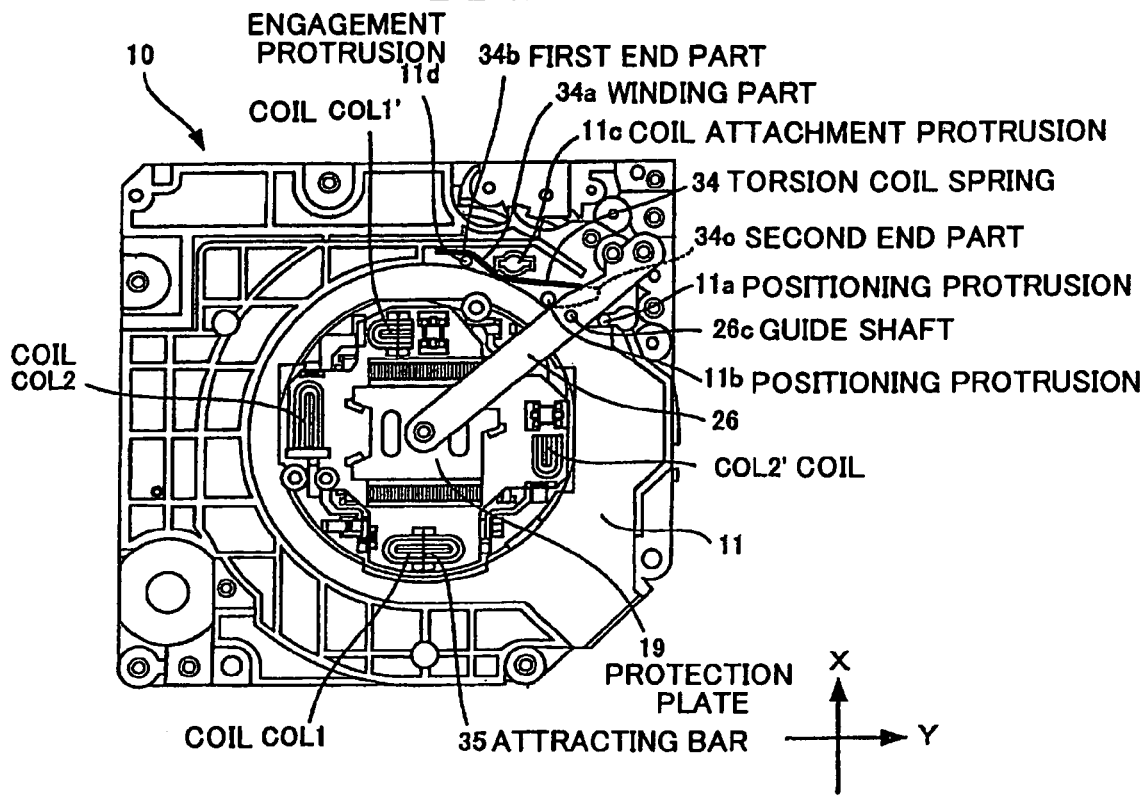
FIG. 8A is a back view illustrating the fixed cylinder.
Figure 8B:
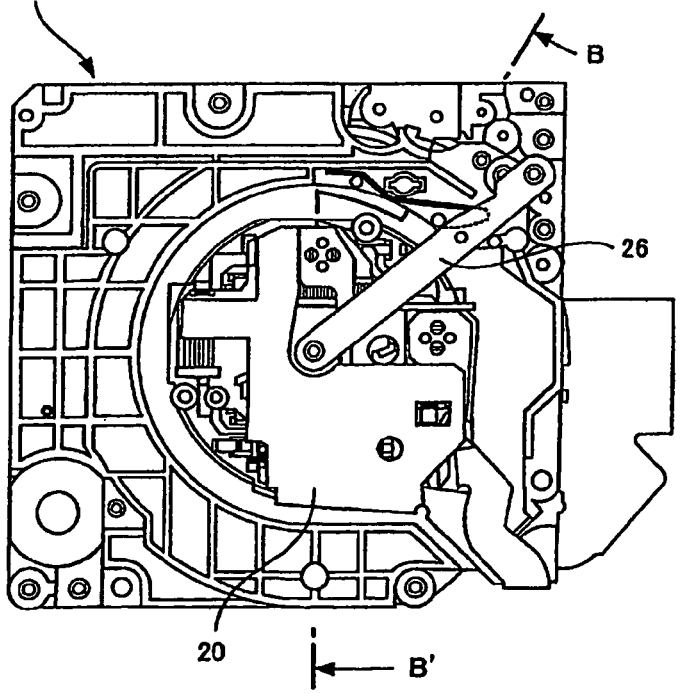
FIG. 8B is a back view illustrating the fixed cylinder excluding a flexible print substrate.

Descriptions will be provided next for a configuration of the image blur compensation mechanism by referring to FIGS. 6, 7, 8A and 8B. FIGS. 6, 7, 8A and 8B illustrate the fixed cylinder which houses a plurality of lenses. FIG. 6 is a front view of the fixed cylinder. FIG. 7 is a longitudinal cross-section of the fixed cylinder taken along the A-A' line. FIGS. 8A and 8B are back views of the fixed cylinder. In FIGS. 6, 7, 8A and 8B, reference numeral 10 denotes the fixed cylinder. The fixed cylinder 10 is shaped like a box, and the interior of the fixed cylinder 10 is used as a housing space in which to receive the lens cylinder. A plate-shaped base member 11 which is rectangular overall is attached to the rear surface of the fixed cylinder 10. In this case, a helicoid 12 for drawing out and in the lens cylinder is formed in the inside wall of the fixed cylinder 10. At least two corner sections are formed by cutting away the two corresponding corners from the fixed cylinder 10. One corner section 10a is used as a section to which to attach a stepping motor STM, which will be described later. In the other corner section 10b, a flexible print substrate 20, which will be described late, is folded.

Figure 9:
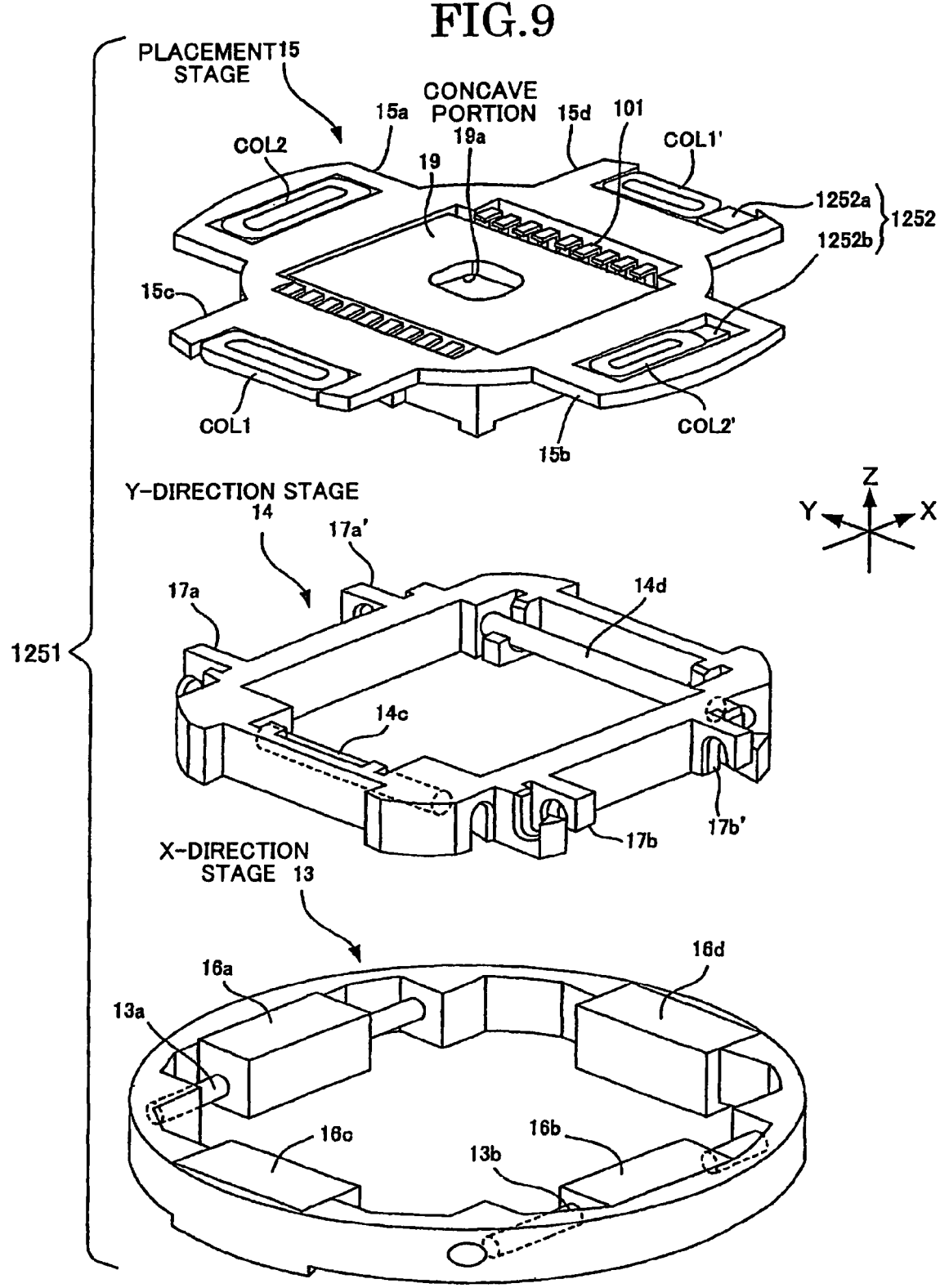
FIG. 9 is an exploded perspective view of a CCD stage.

The CCD stage 1251 as illustrated in FIG. 2 is provided to the base member 11. This CCD stage 1251 chiefly includes an X-direction stage 13 shaped like an annular frame, a Y-direction stage 14 which is rectangular, and a placement stage 15, as illustrated by breaking down the CCD stage 1251 in FIG. 9.

The X-direction stage 13 is fixed to the base member 11. This X-direction stage 13 is provided with a pair of guide shafts 13a and 13b which extend in the X direction. The guide shaft 13a and 13b are spaced out from each other in the Y direction. Four permanent magnets 16a to 16d each shaped like a rectangular parallelepiped are arranged in the X-direction stage 13. These four permanent magnets 16a to 16d are divided into two pairs. The pairing permanent magnets 16a and 16b are arranged in parallel to each other in the X-Y plane in a way that the permanent magnets 16a and 16b are spaced out from each other in the Y direction. In the case of the present embodiment, the pairing guide shafts 13a and 13b are configured to penetrate respectively through the pairing permanent magnets 16a and 16b. However, the configuration is not limited to this example. The pairing guide shafts 13a and 13b may be installed side-by-side with the pairing permanent magnets 16a and 16b, respectively. The other pairing permanent magnets 16c and 16d are arranged in the X-Y plane in a way that the permanent magnets 16c and 16d are spaced out from each other in the X direction.

In the Y-direction stage 14, a pair of guide shafts 14c and 14d each extending in the Y direction are provided in a way that the guide shafts 14c and 14d are spaced out from each other in the X direction. In the Y-direction stage 14, pairing supported parts 17a and 17a' are opposite to each other in a way that the supported parts 17a and 17a' are spaced out from each other in the X direction, and the other paring supported parts 17b and 17b' are opposites to each other in a way that the supported parts 17b and 17b' are spaced out from each other in the X direction. The pairs of supported parts (17a, 17a') and (17b, 17b') are movably supported by the pairing guide shafts 13a and 13b, respectively. This makes the Y-direction stage 14 capable of moving in the X direction.

The CCD 101 is fixed to the placement stage 15. The placement stage 15 includes: pairing coil installation plate parts 15c and 15d protruding in the X direction; and pairing coil installation plates 15a and 15b protruding in the Y direction. The CCD 101 is fixed to the center of the placement stage 15. In the placement stage 15, two pairs of supported parts (albeit their reference numerals are omitted) are formed on the same side as the imaging surface of the CCD 101 is located in a way that the two pairs are spaced out from each other in the X direction. Pairing supported parts are opposite to each other in a way that the supported parts are spaced out from each other in the Y direction, whereas the other pairing supported parts are similarly opposite to each other in a way that the supported parts are spaced out from each other in the Y direction. Pairing supported parts are movably supported by one of the guide shafts 14c and 14d of the Y-direction stage 14, and the other pairing supported parts are movably supported by the other of the guide shafts 14c and 14d. This makes the placement stage 15 as a whole capable of moving in the X-Y direction.

The protection plate 19 is adhered to a surface of the CCD 101, the surface being on the back side of the imaging surface. A tapered concave portion 19a is formed in the center of the protection plate 19. Descriptions will be provided for functions of this concave portion 19a later.

Flat and convolute coils COL1 and COL1' are attached or adhered to the pairing coil installation plate part 15c and 15d, respectively. The coils COL1 and COL1' are connected to each other in series. In addition, flat and convolute coils COL2 and COL2' are attached or adhered to the pairing coil installation plate parts 15a and 15b, respectively. Similarly, the coils COL2 and COL2' are connected to each other in series.

The coils COL1 and COL1' face the permanent magnets 16c and 16d, respectively. The coils COL2 and COL2' face the permanent magnets 16a and 16b, respectively. The pairing coils COL1 and COL1' are used to move the CCD 101 in the X direction, and the other pairing coils COL2 and COL2' are used to move the CCD 101 in the Y direction.

Furthermore, the coils COL1 and COL1' are provided with the respective attracting bars 35 made of a magnetic material in a direction which causes the attracting bars 35 to cross the corresponding coils COL1 and COL1' in the X direction. The installation of these attracting bars 35 (preferably iron bars although it is not limited thereto) cause the magnets (the stage to which the magnets are attached) and the bars (the stage to which the bars are attached) to attract each other. This prevents the stages from going slack.

In this case, hole elements are used for a position detecting element 1252. A hole element 1252a as a part of the position detecting element 1252 is provided to one coil installation plate part 15d which is one of the pairing coil installation plate parts 15c and 15d. Similarly, a hole element 1252b is provided to the other coils installation plate part 15b which is one of the pairing coil installation plate parts 15a and 15b.

Figure 10:
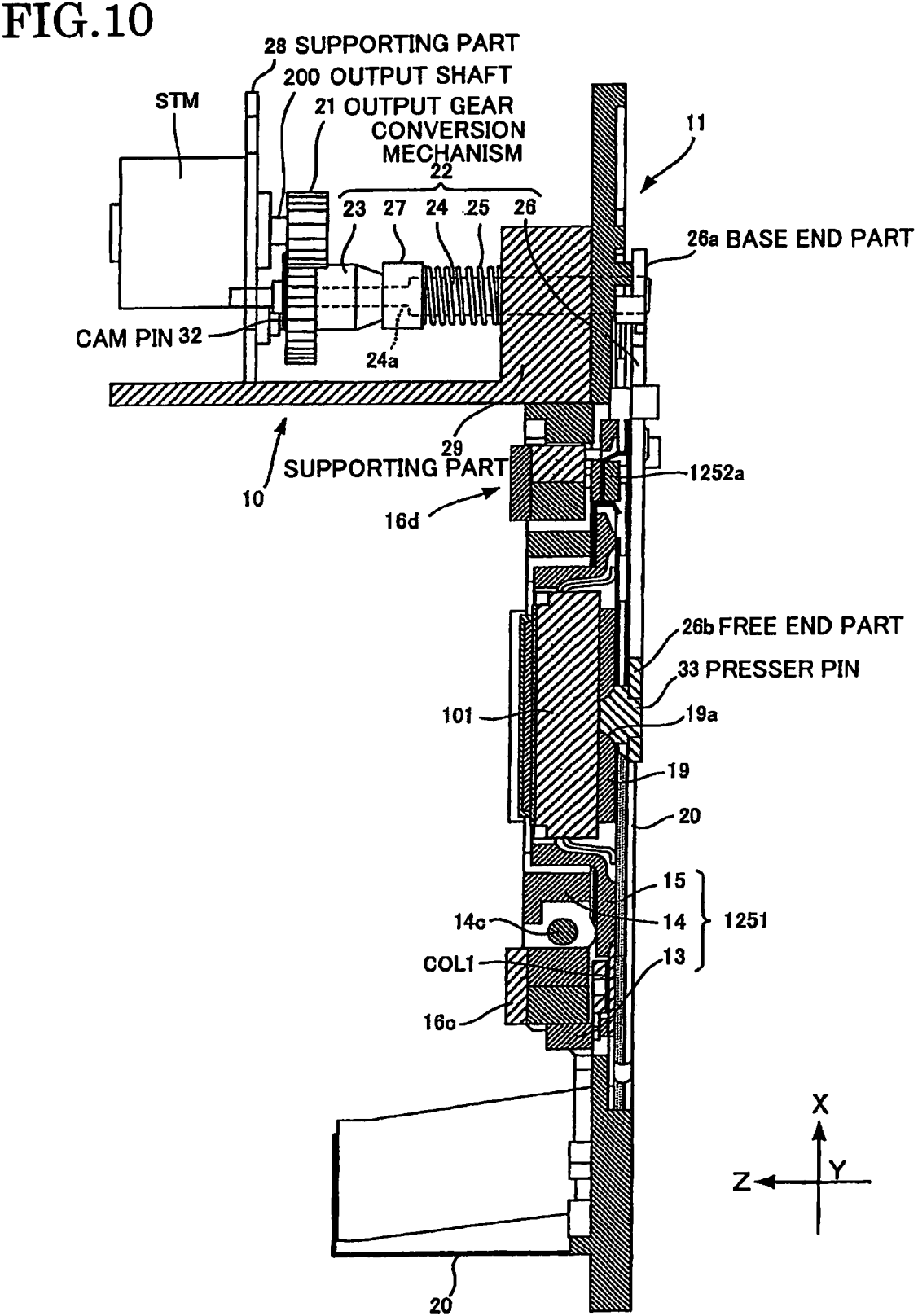
FIG. 10 is a longitudinal cross-sectional view illustrating the fixed cylinder taken along the B-B' line of FIG. 8B.

The CCD 101 is electrically connected to the F/E-IC 102 with the flexible print substrate 20 (see FIG. 10). The hole elements 1252a and 1252b are electrically connected to the operation amplifier with the flexible print substrate 20. The coils COL1, COL1', COL2 and COL'2 are connected to the driver 1254 (see FIG. 2).

Figure 11A:
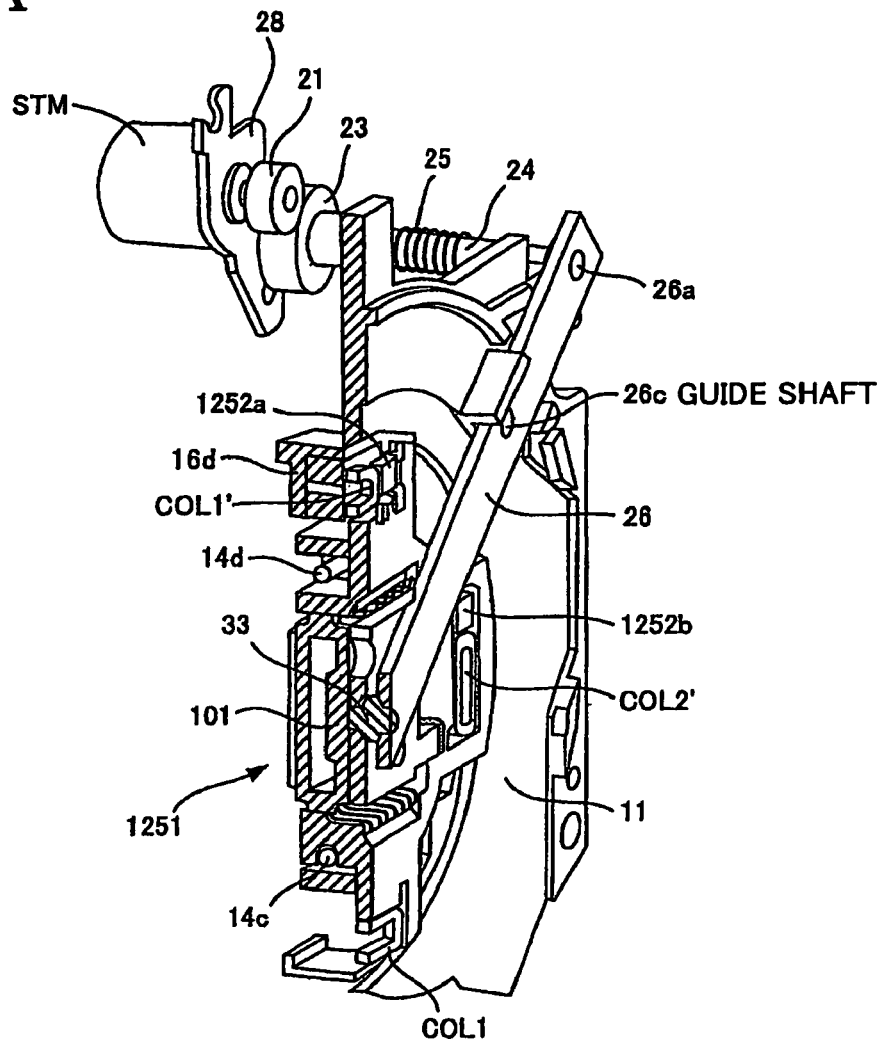
FIG. 11A is a perspective view illustrating a chief part of a forcedly holding mechanism, in which a linkage relationship among the CCD stage, a stepping motor and a conversion mechanism are illustrated.
Figure 11B:
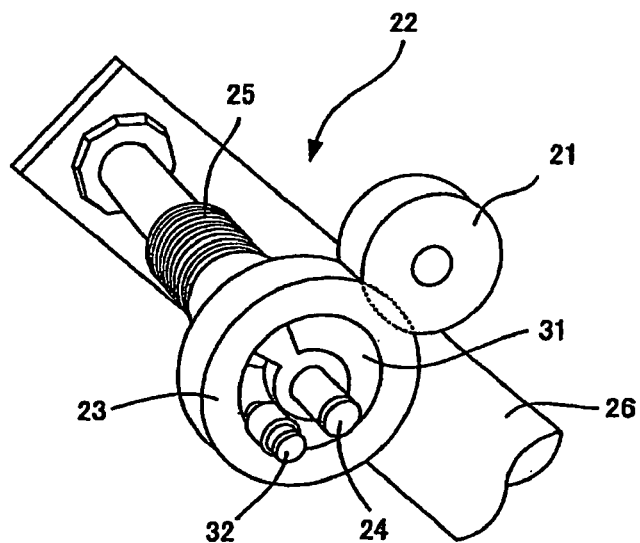
FIG. 11B is a perspective view illustrating the chief part of the forcedly holding mechanism, in which the conversion mechanism is illustrated in a magnified manner.
Figure 12A:
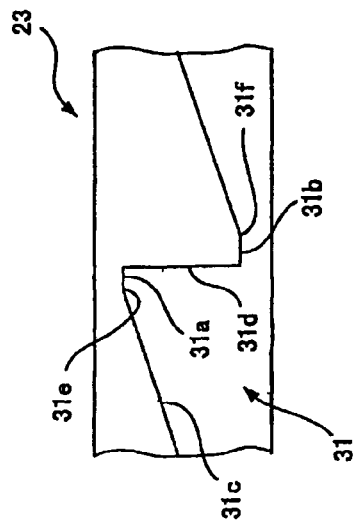
FIG. 12A is a bottom view illustrating a cam groove in a rotary transmission gear, in which the rotary transmission gear is illustrated.
Figure 12B:
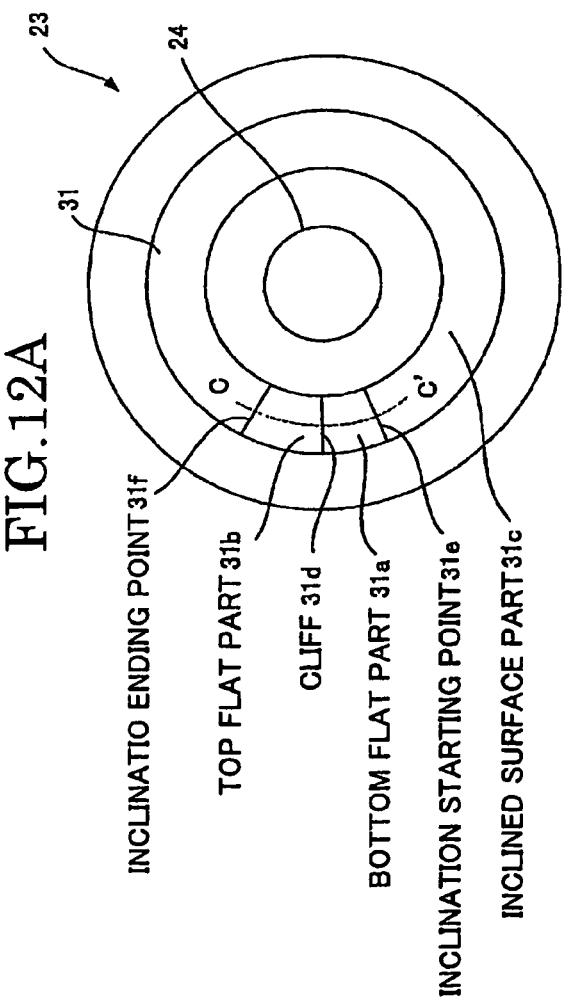
FIG. 12B is a cross-sectional view illustrating the cam groove in the rotary transmission gear, in which the rotary transmission gear taken along the C-C' line of FIG. 12A is illustrated.
Figure 12E:
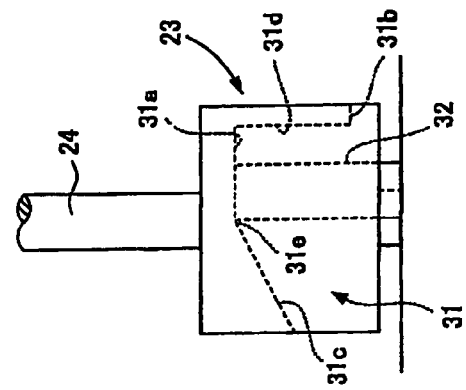
FIG. 12E is a schematic diagram illustrating the cam groove in the rotary transmission gear, and illustrating a state in which the rotary transmission gear is pushed down at maximum when the cam pin comes to abut on a bottom flat part after passing through a cliff.
Figure 12D:
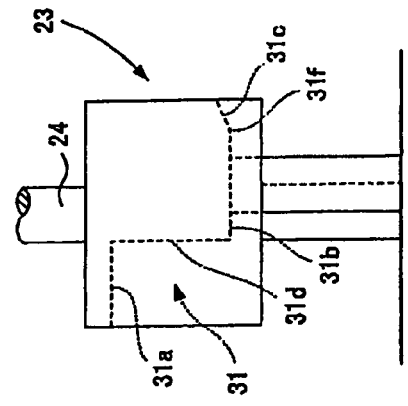
FIG. 12D is a schematic diagram illustrating the cam groove in the rotary transmission gear, and illustrating a state in which the rotary transmission gear is pushed up at maximum when the cam pin comes to abut on a top flat part.
Figure 12C:
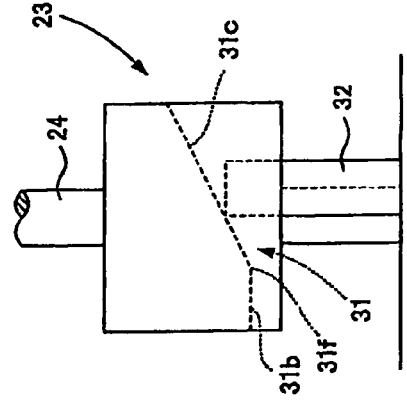
FIG. 12C is a schematic diagram illustrating the cam groove in the rotary transmission gear, and illustrating a state in which a cam pin pushes up the rotary transmission gear by sliding over an inclined surface part.

The mechanism 1263 for holding in the home position as illustrated in FIG. 2 includes the stepping motor STM, as illustrated in FIG. 10 which illustrates a longitudinal cross-section of the fixed cylinder taken along the B-B' line of FIG. 8B, and as illustrated by enlargement in FIGS. 11A and 11B. Descriptions will be provided for control of the drive of the stepping motor STM later. First of all, detailed descriptions will be provided for a mechanical configuration of the holding mechanism 1263.

The stepping motor STM is provided to the corner section 10a of the fixed cylinder 10, as illustrated in FIG. 6. An output shaft 200 of the stepping motor STM is provided with an output gear 21. The corner section 10a of the fixed cylinder 10 is provided with a conversion mechanism 22 for converting rotational motion to linear motion.

The conversion mechanism 22 chiefly includes a rotary transmission gear 23, a reciprocal movement shaft 24, a biasing coil spring 25, a forcedly pressing plate 26 and a spring receiving member 27. Pairing supporting parts 28 and 29 are formed in the corner section 10 of the fixed cylinder 10 in a way that the supporting parts 28 and 29 are spaced out from each other in the Z direction. The supporting part 28 is formed of a motor installation plate. The reciprocal movement shaft 24 is hung between the supporting part 29 and the motor installation plate 28. The rotary transmission gear 23 is located between the pairing supporting parts 28 and 29, and is rotatably supported by the reciprocal movement shaft 24. The rotary transmission gear 23 meshes with the output gear 21.

A part of the reciprocal movement shaft 24 on one end side penetrates through the supporting part 29, and faces the rear of the base member 11. The biasing coil spring 25 is provided between the spring receiving member 27 and the supporting part 29, and thus applies force to the reciprocal movement shaft 24 towards the supporting part 29. The reciprocal movement shaft 24 includes a step part 24a which engages with a shaft hole end surface of the rotary transmission gear 23.

As illustrated in FIGS. 12A to 12E, a cam groove 31 is formed in one end surface part of the rotary transmission gear 23. The cam groove 31 extends in a circumferential direction of the rotary transmission gear 23. The cam groove 31 includes a bottom flat part 31a, a top flat part 31b, and an inclined surface part 31c continuously inclined from the bottom flat part 31a to the top flat part 31b. The cam groove 31 has a cliff 31d between the bottom flat part 31a and the top flat part 31b, and the cliff 31d works as an abutment wall on which a below-described cam pin abuts from its rotational direction.

The cam pin 32 is fixed to the supporting part 28 (see FIG. 10). An extremity of the cam pin 32 slidably contacts the cam groove 31. The bottom flat part 31a is from a cliff 31d to an inclination starting point 31e of an inclined surface part 31c. The length of the bottom flat part 31a in its rotation direction corresponds to 2 pulses of a rotation controlling signal of the stepping motor STM if converted to the signal.

The inclined surface part 31c is from the inclination starting point 31e of the inclined surface part 31c to an inclination ending point 31f leading to the top flat part 31b. The length of the inclined surface part 31c in its rotation direction corresponds to 30 pulses of the rotation controlling signal of the stepping motor STM if converted to the signal.

The top flat part 31b is from the inclination ending point 31f to the cliff 31d. The length of the top flat part 31b in its rotation direction corresponds to 3 pulses of the rotation controlling signal of the stepping motor STM if converted to the signal. 35 pulses of the rotation controlling signal of the stepping motor STM correspond to one rotation of the rotary transmission gear 23. One rotation of the rotary transmission gear 23 causes the reciprocal movement shaft 24 to reciprocate once in the Z-axis direction.

In addition, the forcedly pressing plate 26 is provided to the rear of the base member 11. As illustrated in FIGS. 10 and 11A, the forcedly pressing plate 26 is structured to extend long towards the center of the CCD 101. A base end part 26a of the forcedly pressing plate 26 is fixed to an end part of the reciprocal movement shaft 24. A tapered presser pin 33 is fixed to a free end part 26b of the forcedly pressing plate 26. A guide shaft 26c is formed to protrude from a middle of the forcedly pressing plate 26 extending in the direction.

Positioning protrusions 11a and 11b, a coil attachment protrusion 11c, and an engagement protrusion 11d are formed in the base member 11 as illustrated in FIGS. 8A and 8B. A winding part 34a of a torsion coil spring 34 is attached to the coil attachment protrusion 11c. A first end part 34b of the torsion coil spring 34 engages with the engagement protrusion 11d, and a second end part 34c of the torsion coil spring 34 engages with the guide shaft 26c. A guide hole (not illustrated) for guiding the guide shaft 26c is formed in the base member 11.

The forcedly pressing plate 26 reciprocates in a direction (Z-axis direction) which makes the forcedly pressing plate 26 away from, and closer to, the base member 11 in conjunction with reciprocal movement of the reciprocal movement shaft 24 while the torsion coil spring 34 causes the forcedly pressing plate 26 to abut on the positioning protrusion 11a. The guide 26c plays a role in causing the forcedly pressing plate 26 to reciprocate in a stable posture.

Figure 13A:
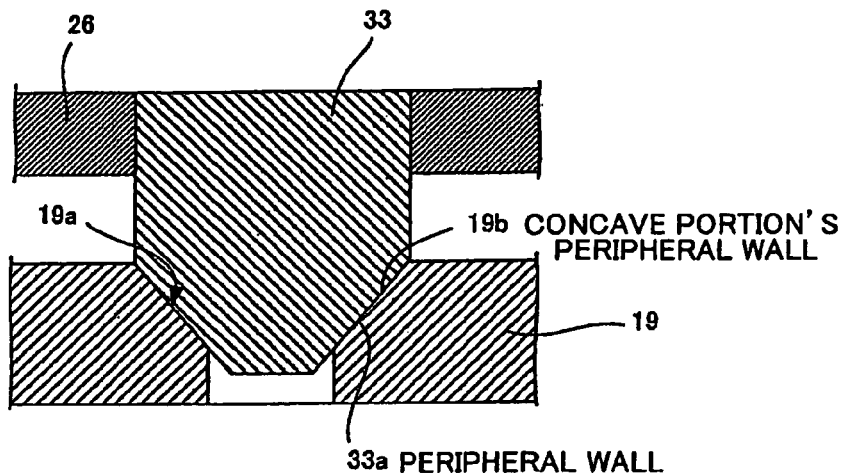
FIG. 13A is a partially-enlarged cross-sectional view illustrating a state in which a presser pin is fitted into a concave portion, and illustrating a state in which the presser pin and the concave portion's peripheral wall are brought into intimate contact with each other.
Figure 13B:
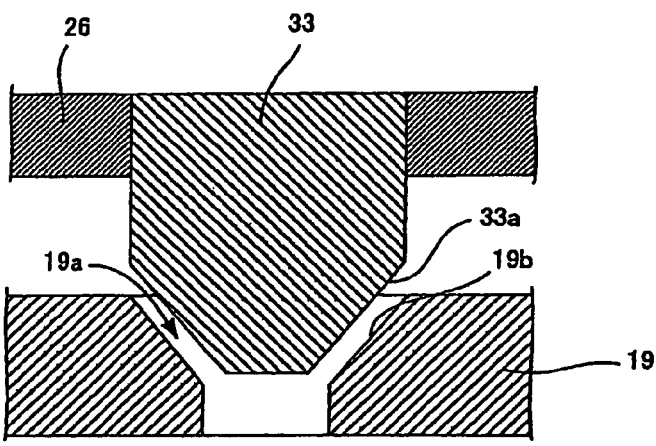
FIG. 13B is a partially-enlarged cross-sectional view illustrating the state in which the presser pin is fitted into the concave portion, and illustrating a state in which the presser pin and the concave portion's peripheral wall are brought away from each other.

The presser pin (fitting protrusion) 33 is fitted into the concave portion (fitting hole) 19a. Thereby, the presser pin 33 plays a role in mechanically holding the placement stage 15 (see FIG. 9) at the home position. As illustrated by enlargement in FIG. 13A, a state in which a peripheral wall 33a of the presser pin 33 and a concave portion's peripheral wall 19b of the protection plate 19 are intimately fitted into each other corresponds to a hold resting position (see FIG. 12D) of the cam pin 32. As illustrated by enlargement in FIG. 13B, a state in which the peripheral wall 33a of the presser pin 33 and the concave portion's peripheral wall 19b of the protection plate 19 are furthest away from each other corresponds to a release resting position (see FIG. 12E) of the cam pin 32. The hold resting position of the cam pin 32 is a forced home position of the placement stage 15 at the same time.

Subsequently, a target point to which the CCD 101 is moved is determined on the basis of an input from the gyro sensor 1241. The gyro sensor 1241 is arranged in order that the gyro sensor 1241 senses rotations of the camera in the pitch and yaw directions. The A/D converter 10411 captures output from the gyro sensor 1241 for an interval of T seconds, and thus converts the output from analog to digital.

An angle of change in posture of the camera in the yaw direction is defined as $$\theta \text{yaw}(t) = \Sigma \omega \text{yaw}(i) \times T \ (i=0, \ldots, t)$$

and an angle of change in posture of the camera in the pitch direction is defined as $$\theta \text{pitch}(t) = \Sigma \omega \text{pitch}(i) \times T \ (i=0, \ldots, t)$$

where ωyaw(t) denotes an instantaneous angular velocity in the yaw direction; ωpitch(t), an instantaneous angular velocity in the pitch direction; θyaw(t), the angle of change in posture of the camera in the yaw direction; and θpitch(t), the angle of change in posture of the camera in the pitch direction.

Figure 14:
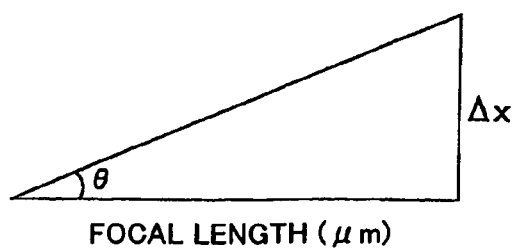
FIG. 14 is a diagram illustrating a relationship between a focal length of a lens and a deviation.
Figure 15:
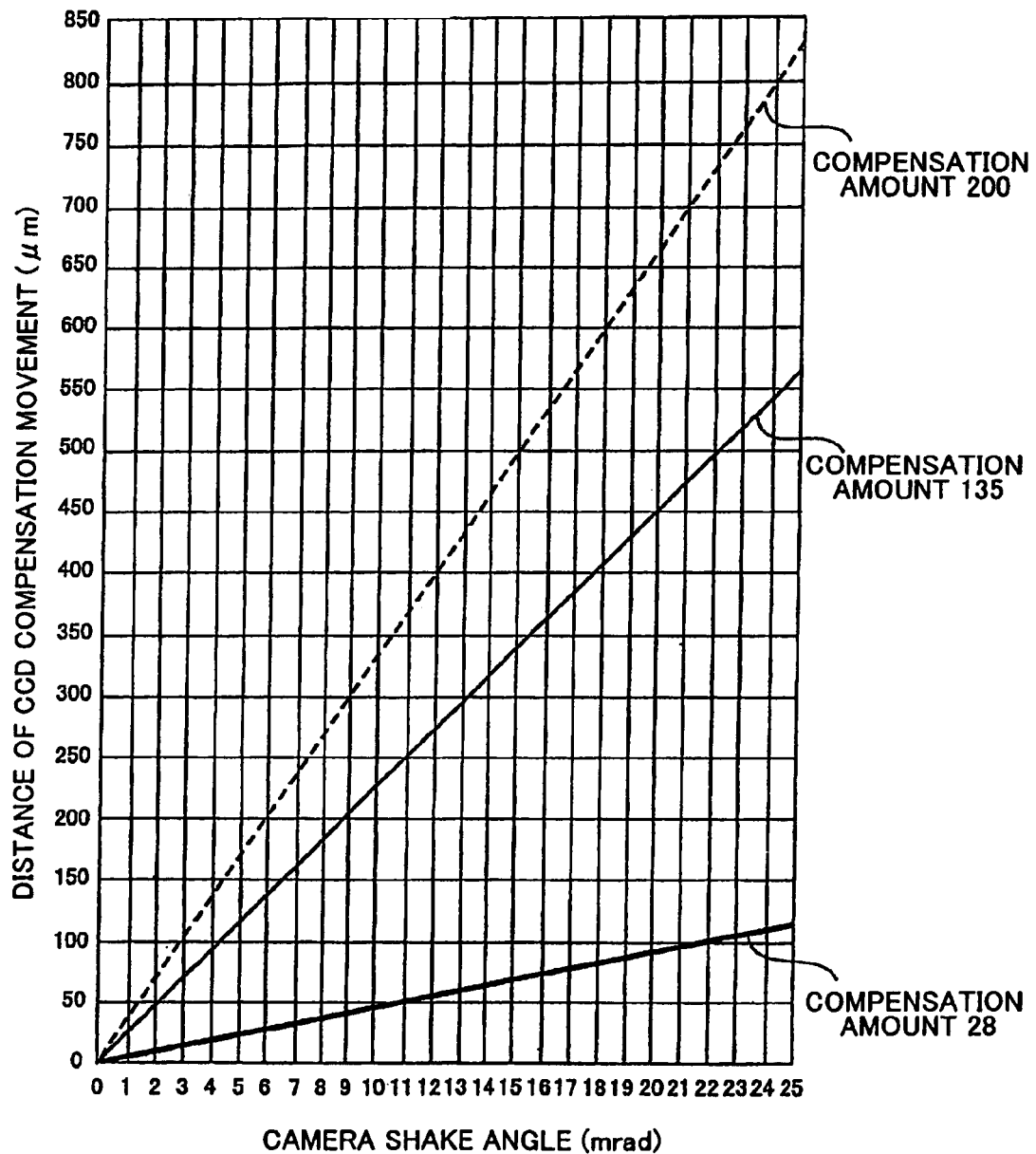
FIG. 15 illustrates a relationship among camera shake angles and distances of CCD compensation movement.

On the other hand, the focal length f is determined on the basis of the zoom point zp and the focal point fp. A distance of movement of an image in conjunction with rotation of the camera in the yaw direction is defined as $$D\text{yaw}(t) = f \times \tan(\theta \text{yaw}(t))$$

and a distance of movement of the image in conjunction with rotation of the camera in the pitch direction is defined as $$D\text{pitch}(t) = f \times \tan(\theta \text{pitch}(t))$$

where Dyaw(t) denotes the distance of movement of the image in conjunction with rotation of the camera in the yaw direction; Dpitch(t), the distance of movement of the image in conjunction with rotation of the camera in the pitch direction; θyaw(t), the angle of change in posture of the camera in the yaw direction; and θpitch(t), the angle of change in posture of the camera in the pitch direction. These are the distances by which the CCD 101 should be moved. FIG. 14 illustrates the distance by which the CCD should be moved according to the focal length. FIG. 15 and Table 1 illustrate a relationship among camera shake angles (or image blur angles) and distances of CCD compensation movement.

TABLE 1

| 35-mm Focal Length | 28 | 135 | 200 |
|---|---|---|---|
| Actual Focal Length | 4.7 | 22.6 | 33.5 |
| Camera Shake Angles and Image Movement | Compensation Amount (one side) | | |
| Camera Shake Angles (mrad) | 28 | 135 | 200 |
| 0 | 0 | 0 | 0 |
| 0.5 | 2 | 11 | 17 |
| 1 | 5 | 23 | 34 |
| 1.5 | 7 | 34 | 50 |
| 2 | 9 | 45 | 67 |
| 2.5 | 12 | 57 | 84 |
| 3 | 14 | 68 | 101 |
| 3.5 | 16 | 79 | 117 |
| 4 | 19 | 91 | 134 |
| 4.5 | 21 | 102 | 151 |
| 5 | 23 | 113 | 168 |
| 5.5 | 26 | 125 | 184 |
| 6 | 28 | 136 | 201 |
| 6.5 | 31 | 147 | 218 |
| 7 | 33 | 158 | 235 |
| 7.5 | 35 | 170 | 252 |
| 8 | 38 | 181 | 268 |
| 8.5 | 40 | 192 | 285 |
| 9 | 42 | 204 | 302 |
| 9.5 | 45 | 215 | 319 |
| 10 | 47 | 226 | 335 |
| 10.5 | 49 | 238 | 352 |
| 11 | 52 | 249 | 369 |
| 11.5 | 54 | 260 | 386 |
| 12 | 56 | 272 | 403 |
| 12.5 | 59 | 283 | 419 |
| 13 | 61 | 294 | 436 |
| 13.5 | 63 | 306 | 453 |
| 14 | 66 | 317 | 470 |
| 14.5 | 68 | 328 | 486 |
| 15 | 70 | 340 | 503 |
| 15.5 | 73 | 351 | 520 |
| 16 | 75 | 362 | 537 |
| 16.5 | 77 | 374 | 554 |
| 17 | 80 | 385 | 570 |
| 17.5 | 82 | 396 | 587 |
| 18 | 85 | 408 | 604 |
| 18.5 | 87 | 419 | 621 |
| 19 | 89 | 430 | 637 |
| 19.5 | 92 | 442 | 654 |
| 20 | 94 | 453 | 671 |
| 20.5 | 96 | 464 | 688 |
| 21 | 99 | 476 | 704 |
| 21.5 | 101 | 487 | 721 |
| 22 | 103 | 498 | 738 |
| 22.5 | 106 | 510 | 755 |
| 23 | 108 | 521 | 772 |
| 23.5 | 110 | 532 | 788 |
| 24 | 113 | 543 | 805 |
| 24.5 | 115 | 555 | 822 |
| 25 | 117 | 566 | 839 |

Figure 16A:
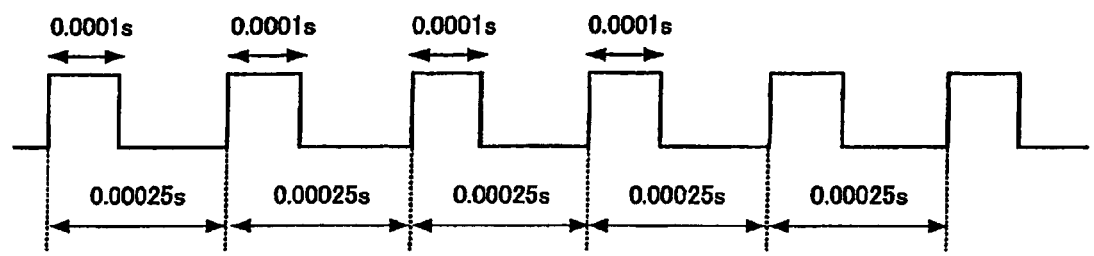
FIG. 16A illustrates a control period of servo control for operating the CCD, and in which a control period which is 0.0001 seconds is illustrated.
Figure 16B:
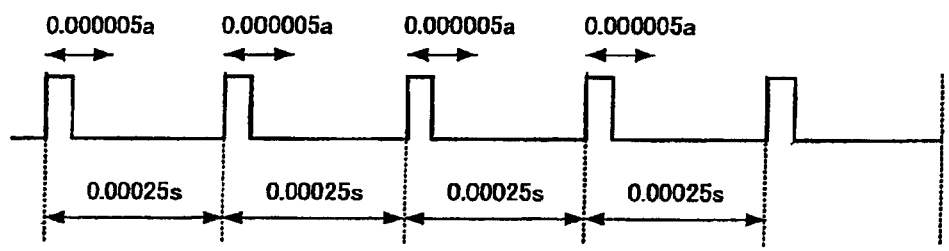
FIG. 16B illustrates the control period of the servo control for operating the CCD, and in which a control period which is 0.000005 seconds is illustrated.
Figure 17:
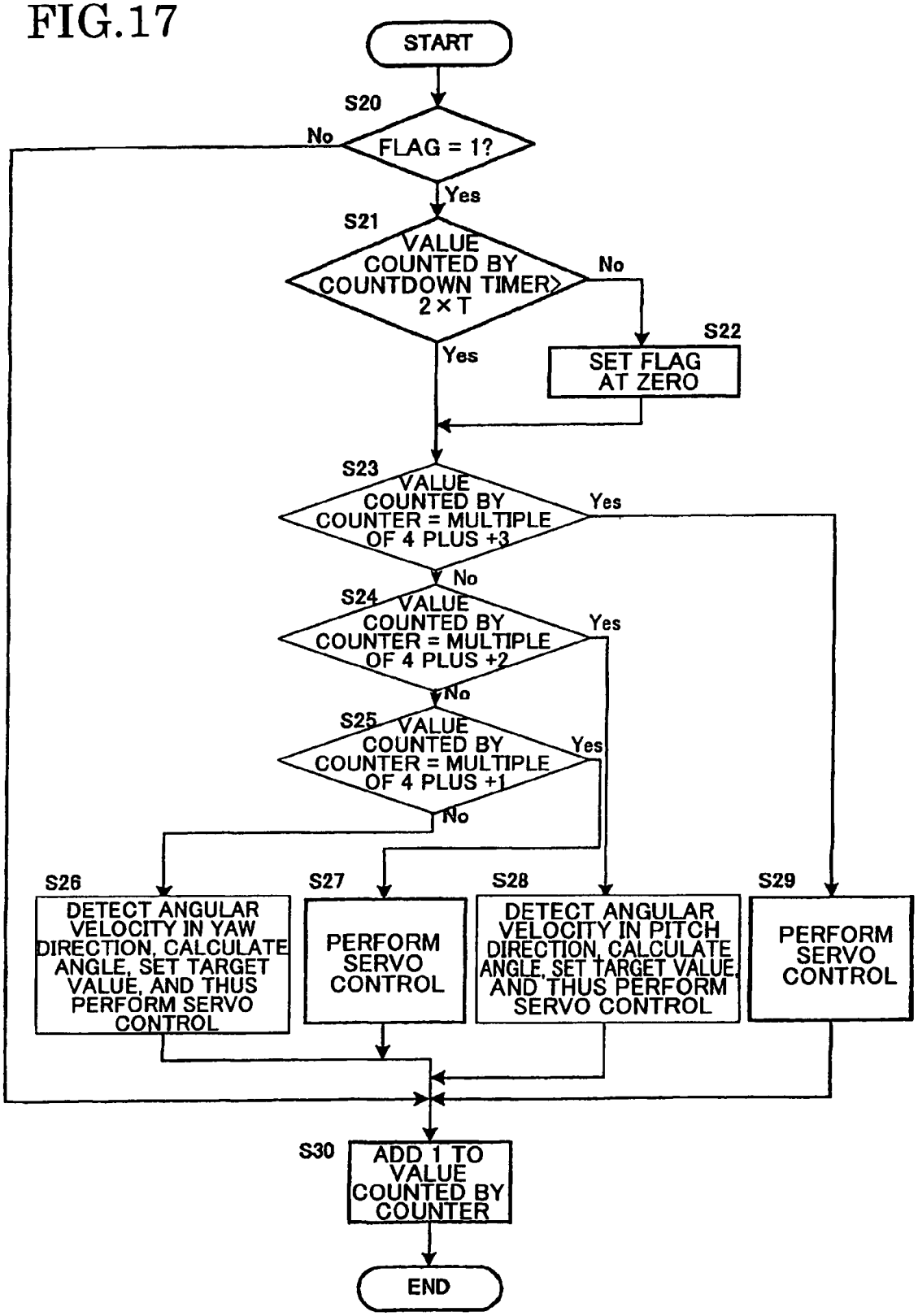
FIG. 17 is a flowchart for performing an image blur compensating process.
Figure 18:
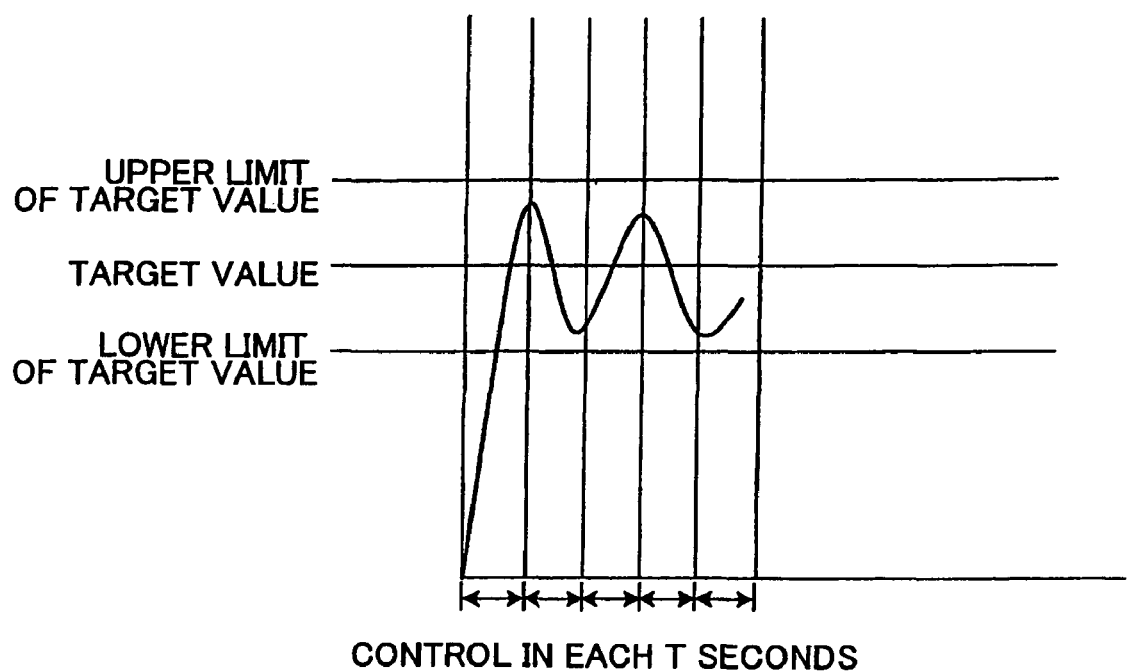
FIG. 18 is a diagram illustrating how the CCD is moved to a target position.

FIGS. 16A and 16B are timing charts illustrating control periods of servo control for operating the CCD. In the case of the present embodiment, steps in a flowchart illustrated in FIG. 17 are carried out in each period T of 0.00025 seconds. As a result, the CCD moves to the target position as illustrated in FIG. 18.

As illustrated in FIG. 17, first of all, it is determined whether or not a flag is "1" (in step S20). In a case where the flag is "1" (in a case of YES in step S20), the flow proceeds to step S21. In a case where the flag is not "1" (in a case of NO in step S20), the flow proceeds to step S30. In this respect, it takes 0.0001 seconds to carry out the steps in the flowchart illustrated in FIG. 17 in the case where the flag is "1" meaning that an image blur compensation should be performed (see FIG. 16A). It takes 0.000005 seconds to carry out the steps in the flowchart illustrated in FIG. 17 in a case where the flag is "0" meaning that no image blur compensation is performed (see FIG. 16B).

In the case where it is determined in step S20 that the flag is "1," it is determined whether or not a value obtained by dividing time left until an interruption is going to take place as a result that the countdown timer reads zero second by the period T is more than twice as large as a value on the period T, or whether or not a value on the time read by every countdown timer is larger than 2×T (in step S21). In a case where a result of the determination in step S21 is YES, the flow proceeds directly to step S23. In a case where a result of the determination in step S21 is NO, the flag is set at "0" (in step S22), and thereafter the flow proceeds to step S23.

Subsequently, it is determined whether or not a value counted by the counter is a multiple of 4 plus 3 (in step S23). In a case where a result of the determination is YES, the CCD is operated by performing a servo control (in step S29), and thereafter the flow proceeds to step S30. In a case where a result of the determination is NO, the flow proceeds to step S24.

Afterward, it is determined whether or not the value counted by the counter is a multiple of 4 plus 2 (in step S24). In a case where a result of the determination is YES, a target value is set by detecting the angular velocity in the pitch direction and thus calculating the angle, and concurrently the CCD is operated by performing the servo control (in step S28). Thereafter, the flow proceeds to the step S30. In a case where a result of the determination in step S24 is NO, the flow proceeds to step S25.

After that, it is determined whether or not the value counted by the counter is a multiple of 4 plus 1 (in step S25). In a case where a result of the determination is YES, the CCD is operated by performing the servo control (in step S27), and thereafter the flow proceeds to step S30. In a case where a result of the determination in step S25 is NO, a target value is set by detecting the angular velocity in the yaw direction and thus calculating the angle, and concurrently the CCD is operated by performing the servo control (in step S26). Thereafter, the flow proceeds to step S30.

Finally, a step of adding "1" to the value counted by the counter is carried out in step S30. Thereby, the whole process is completed.

The servo control has a characteristic in that, the shorter the period T [seconds] is, the better the control value can be converged near the target value. In this sense, the intervals at which the image blur compensation is performed are the shortest, if, for example, T=0.0001 seconds (each time the compensation process is performed). In this case, however, the CPU needs to be used for process other than the image blur compensation process. For this reason, occupancy of the CPU for the image blur compensation can not be raised to 100%. On the other hand, if the occupancy of the CPU for the image blur compensation process is too high, the image blur compensation process is obstructed by interruption for processes other than the image blur compensation process. As a result, interruption for the image blur compensation process is out of timing, or an interruption process for the image blur compensation fails to be performed. These adversely affect the implemented functions other than the image blur compensation. For the purpose of avoiding these problems, the occupancy of the CPU is set at 40%, which makes the period T equal to 0.00025 seconds, in the case of the present embodiment. A centering process which causes the CCD to remain in the center by use of the servo control and an image blur compensation during exposure are both performed at intervals of T=0.00025 seconds as well.

Figure 19:
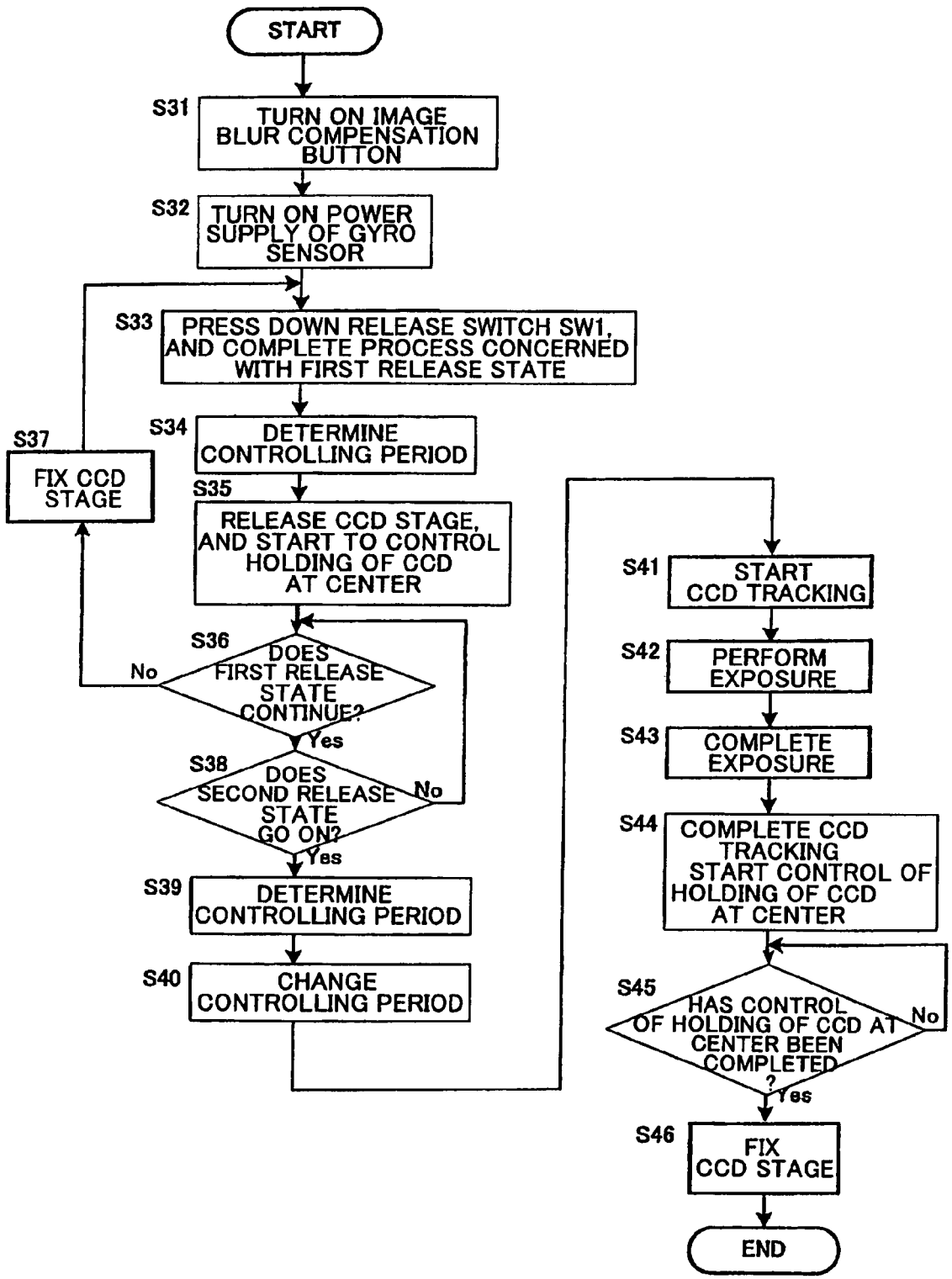
FIG. 19 is a flowchart of steps which are carried out while taking a picture.

FIG. 19 is a flowchart illustrating steps which are carried out while taking a still image. The release switch SWI illustrated in FIG. 1A is pressed down, and thereby the holding mechanism which has held the CCD is released after detecting the first release state in which the release switch SW1 is pressed down by half. Concurrently, the centering for holding and controlling the CCD at the centering is performed. After detecting the second release state in which the release switch SW1 is further pressed down, the tracking of the CCD starts, and exposure is performed. Once the exposure is completed, the tracking is completed, and the centering is performed again. Once the centering is completed, the CCD stage is fixed. The processes for the first and second release states are controlled by the CPU block 1043 via the sub-CPU 109.

As illustrated in FIG. 19, first of all, once the image blur compensation switch SW14 is turned on (in step S31), the power supply of the gyro sensor is turned on (in step S32). Subsequently, the release switch SW1 is pressed down by half. When a process concerned with the first release state is completed (in step S33), a controlling period is determined (in step S34). Thus, the CCD stage 1251 is released, and concurrently a control of the holding the CCD 101 at the center (centering) is started (in step S35).

Subsequently, it is determined whether or not the first release state continues (in step S36). In a case where the first release state no longer continues (in a case of NO in step S36), the CCD stage 1251 is fixed (in step S37). Thereafter, the flow returns to step S33. In a case where it is determined in step S36 that the first release state continues (in a case YES in step S36), it is determined whether or not the second release state 2 goes on as a result that the release switch SW1 has been further pressed down (in step S38). In a case where the release switch SW has not been further pressed down (in a case of NO in step S38), the flow returns to step S36.

In a case where it is determined in step S38 that the second release state goes on (in a case of YES in step S38), the controlling period is determined again (in step S39). Once the controlling period is changed from the previous one to the newly-determined one (in step S40), the CCD tracking is started (in step S41). At this time, an exposure is performed (in step S42). Once the exposure is completed (in step S43), the CCD tracking is completed, and concurrently a control of the holding of the CCD 101 at the center is started (in step S44).

Finally, it is determined whether or not the control of the holding of the CCD 101 at the center has been completed (in step S45). In a case where the control has been completed (in a case of YES in step S45), the CCD stage 1251 is fixed (in step S46). Thereby, the whole process is completed.

Figure 20:
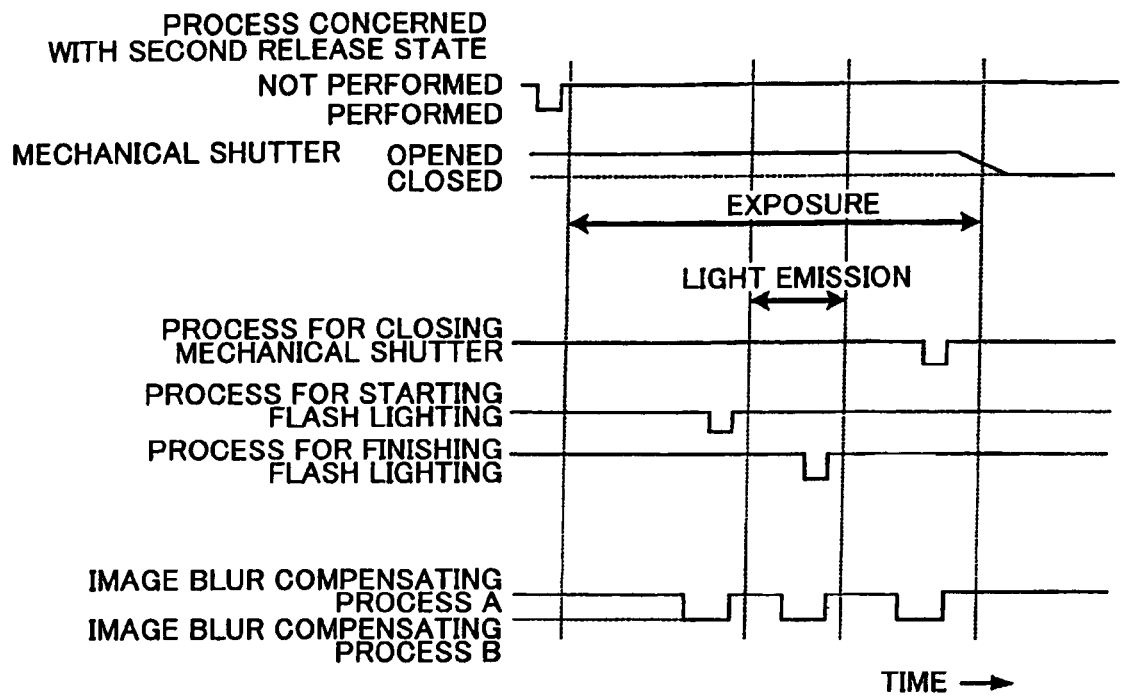
FIG. 20 is a timing chart of steps which are carried out while performing an exposure.
Figure 21:
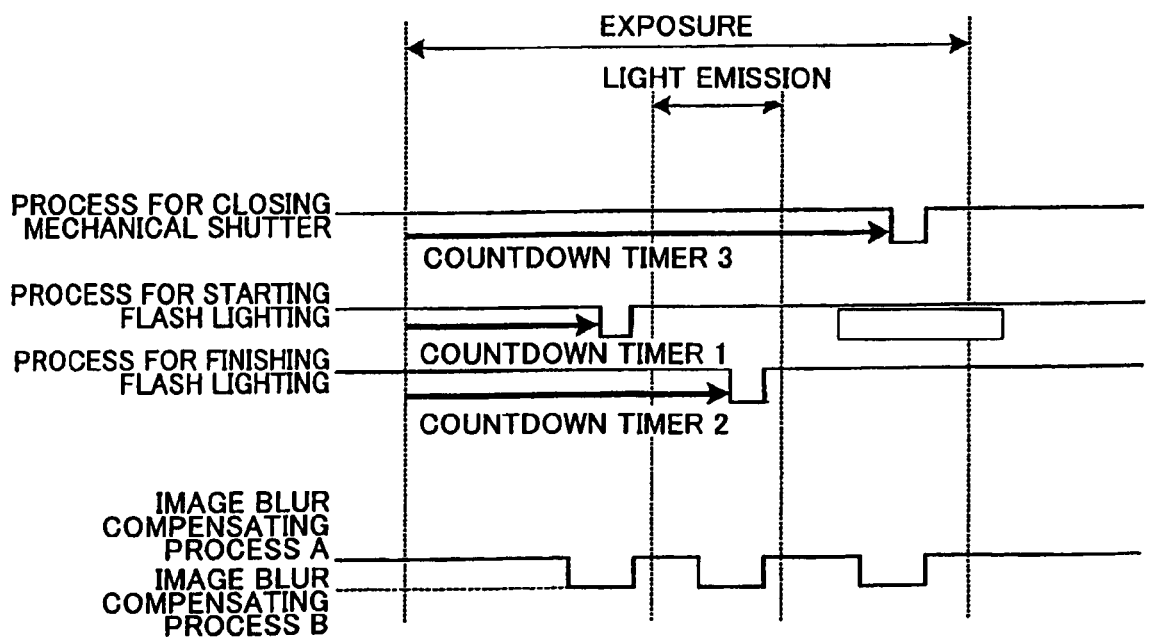
FIG. 21 is a diagram illustrating the timing chart of FIG. 20 in detail.
Figure 22B:
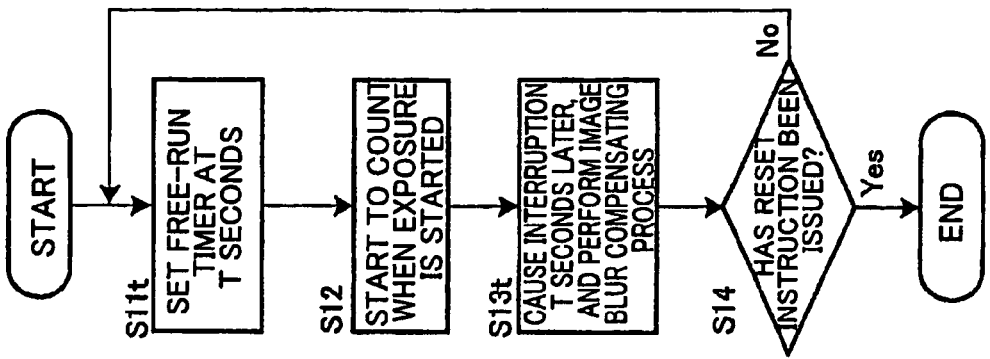
FIG. 22B illustrates operation of another timer function, in which flowchart for a free-run timer is illustrated.
Figure 22A:
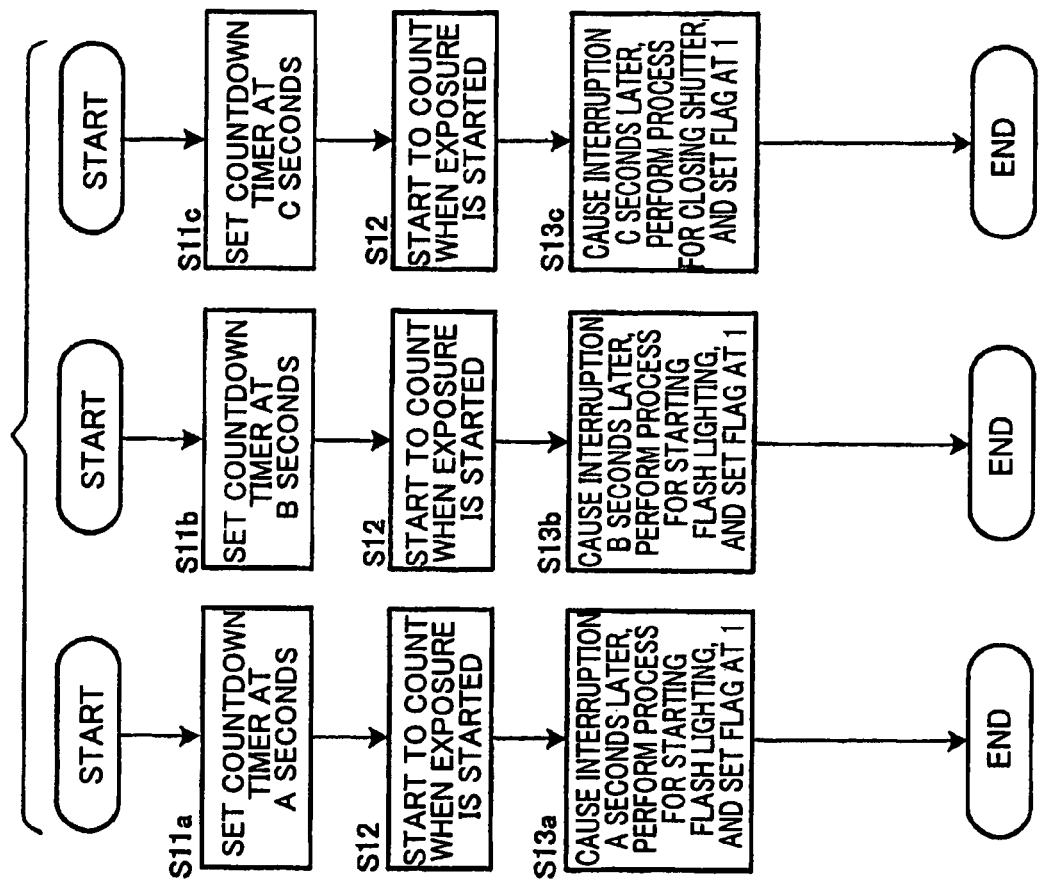
FIG. 22A illustrates operation of a timer function, in which a flowchart for a countdown timer is illustrated.

FIGS. 20 and 21 illustrate timing charts of steps which are carried out while performing an exposure. In addition, FIGS. 20 and 21 illustrate chief sections of their respective timing charts in detail. Furthermore, FIG. 22A and FIG. 22B are flowcharts illustrating how to use two types of timers in common with FIG. 4A and FIG. 4B. FIG. 22A is flowcharts for countdown timers, and FIG. 22B is a flowchart for a free-run timer.

Image blur compensating processes A of FIGS. 20 and 21 are processes which are carried out in the case where the result of the determination on whether or not the flag is 1 in step S20 of FIG. 17 is YES. These processes are those each repeating re-calculation of the angle, re-setting of the target position, and tracking of the CCD to the target position by servo control. Such process repetition extends a length of time for which the CPU is occupied.

On the other hand, image blur compensating processes B are processes which are carried out in the case where the result of the determination on whether or not the flag is 1 in step S20 of FIG. 17 is NO. These processes are those which do not repeat the re-calculation of the angle, the re-setting of the target position, or the tracking of the CCD to the target position by servo control. Because the tracking is not carried out, a length of time for which the CCD is occupied is extremely shorter in the image blur compensating processes B than in the image blur compensating processes A.

In the case of the present embodiment, when a process concerned with an exposure (a process for closing the shutter, a process for starting a flash lighting, or a process for finishing the flash lighting) is going to be started, the image blur compensating process is designed to be stopped (conversion is designed to be made from the image blur compensating process A to the image blur compensating process B) when time at which to start the process concerned with the exposure comes within the range of a predetermined time. In other words, the process for closing the shutter, the process for starting the flash lighting or the process for finishing the flash lighting is designed to be carried out prior to the image blur compensating process.

Reference is now made to FIGS. 20 and 21 from the left in accordance with the time sequence before an exposure. By use of brightness of a monitoring image, a length of time for exposure is set at C=0.5 seconds; the time at which to start a flash lighting is set at B=0.067 second later; and the time A at which to finish the flash lighting is set at A=0.068 second later. In addition, the free-run timer illustrated in FIG. 22B is started before the exposure. The initial value of the flag is "1." The steps illustrated in the flowchart of FIG. 17 continues to be performed repeatedly in a period of T seconds.

Countdown timers 1, 2 and 3 as illustrated in FIG. 22A are started to count at the same time as the exposure starts (see FIG. 21).

Immediately before a process for starting the flash lighting is carried out, a result of the determination on whether or not the value on the time counted by every countdown timer is larger than 2×T in step S21 of FIG. 17 changes from YES to NO, and thus the flag is turned to 0 (zero). At and after the next interruption, the result of the determination on whether or not the flag is 1 in step S20 of FIG. 17 is NO. For this reason, the flow is completed without carrying out almost none of the steps illustrated in the flowchart of FIG. 17.

The countdown timer 1 counts 0 (zero) A seconds later which has been set beforehand, and an interruption of the process for starting the flash lighting take place. Even if timing at which to perform the process for starting the flash lighting happens to be equal to timing at which to perform the camera shaking compensating process, the fact that the flash lighting is out of timing can be ignored because it takes only 0.000005 seconds to perform the image blur compensating process.

At the end of the process for starting the flash lighting, the flag is set at 1 (one). At the ensuing interruption of the image blur compensation, the result of the determination on whether or not the value on the time counted by every countdown timer is larger than 2×T in step S21 of FIG. 17 is turned to YES again. Thus, the image blur compensating process continues to be carried out.

Immediately before the process for finishing the flash lighting, the result of the determination on whether or not the value on the time counted by every countdown timer is larger than 2×T in step S21 of FIG. 17 changes from YES to NO, and thus the flag is turned to 0 (zero). At and after the next interruption, the result of the determination on whether or not the flag is 1 in step S20 of FIG. 17 is turned to NO. For this reason, the flow is completed without carrying out almost none of the steps illustrated in the flowchart of FIG. 17.

Subsequently, the countdown timer 2 counts 0 (zero) B seconds later which has been set beforehand, and an interruption of the process for finishing the flash lighting takes place. Even if timing at which to perform the process for finishing the flash lighting happens to be equal to timing at which to perform the camera shaking compensating process, the finishing of the flash lighting is virtually not out of timing, because almost none of the steps for the image blur compensating process are carried out at this time.

At the end of the process for finishing the flash lighting, the flag is set at 1 (one). At the ensuing interruption of the image blur compensation, the result of the determination on whether or not the value on the time counted by every countdown timer is larger than 2×T in step S21 of FIG. 17 is turned to YES again. Thus, the image blur compensating process continues to be carried out.

Immediately before the process for closing the mechanical shutter, the result of the determination on whether or not the value on the time counted by every countdown timer is larger than 2×T in step S21 of FIG. 17 changes from YES to NO, and thus the flag is turned to 0 (zero). At and after the next interruption, the result of the determination on whether or not the flag is 1 in step S20 of FIG. 17 is turned to NO. For this reason, the flow is completed without carrying out almost none of the steps illustrated in the flowchart of FIG. 17.

Thereafter, the countdown timer 3 counts 0 (zero) C seconds later which has been set beforehand, and an interruption of the process for closing the mechanical shutter takes place. Even if timing at which to perform the process for closing the mechanical shutter happens to be equal to timing at which to perform the camera shaking compensating process, the closing of the mechanical shutter is virtually not out of timing, because almost none of the steps for the image blur compensating process are carried out at this time.

At the end of the process for closing the mechanical shutter, the flag is set at 1 (one). At the ensuing interruption of the image blur compensation, the result of the determination on whether or not the value on the time counted by every countdown timer is larger than 2×T in step S21 of FIG. 17 is turned to YES again. Thus, the image blur compensating process continues to be carried out.

Figure 23:
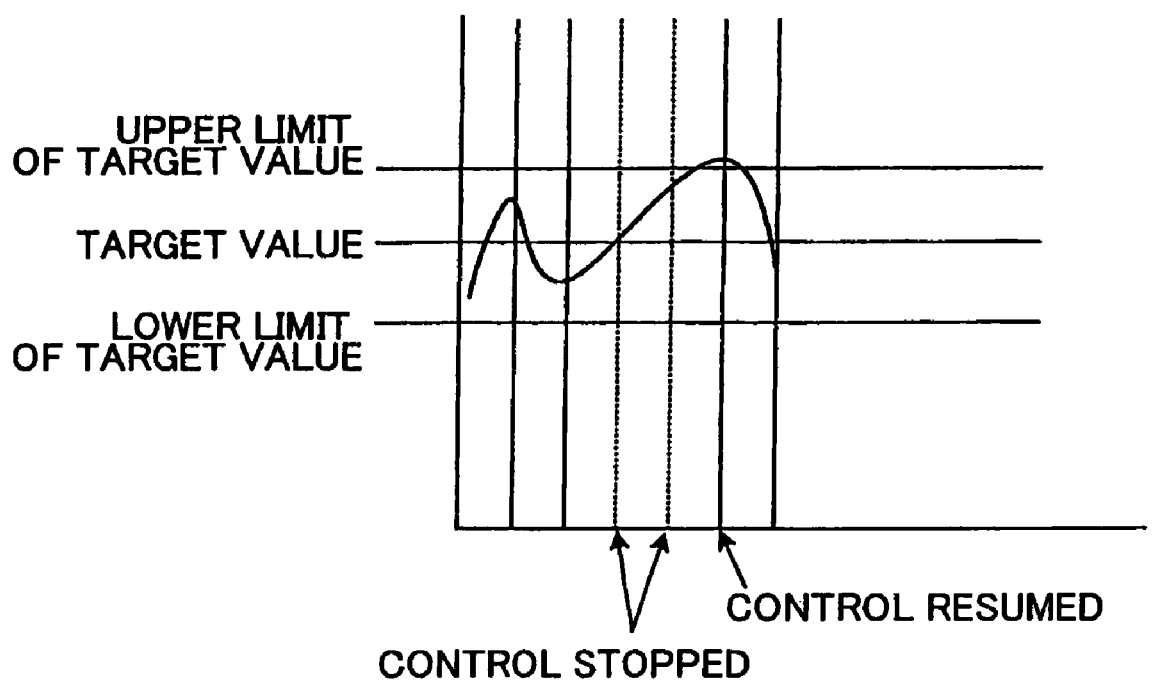
FIG. 23 is a diagram illustrating how the CCD is moved to a target position.

Because no compensation is controlled in the case of the image blur compensating process B as described above, a value on an electric current to be flowed to the coils remains as large as lately set. Thus, the CCD continues moving in the traveling direction with this lately-set electric current value, and an exposure is accordingly performed at a position away from the target position (see FIG. 23).

Figure 24:
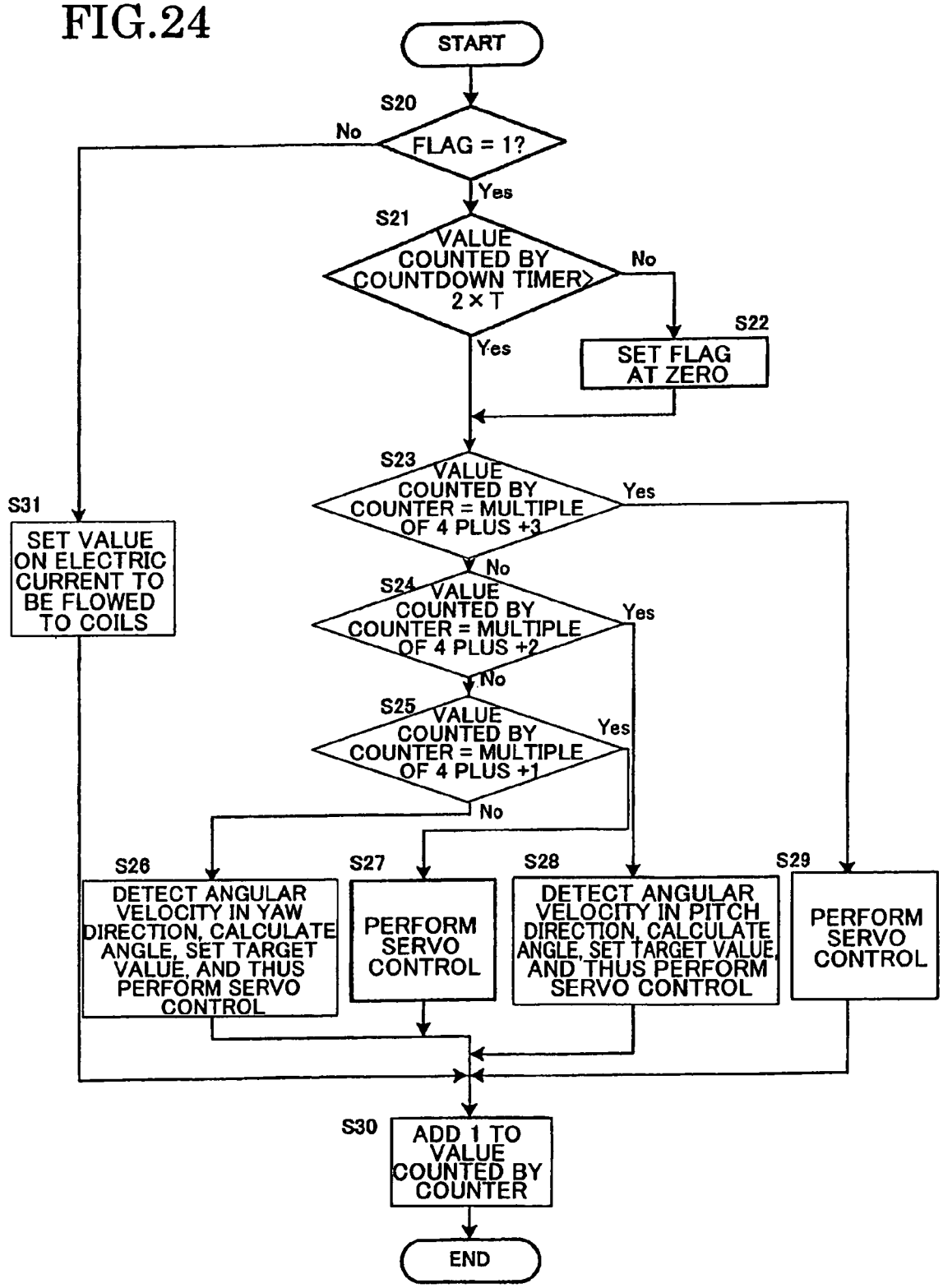
FIG. 24 is a flowchart for performing an image blur compensating process.

At the position, the steps in the flowchart illustrated in FIG. 24 are carried out. These steps are almost the same as those in the flowchart illustrated in FIG. 17. A step which makes the flowchart illustrated in FIG. 24 different from the flowcharts illustrated in FIG. 17 is that a value on an electric current to be flowed to the coils is set in a case where the result of the determination on whether or not the flag is 1 (one) is NO (in the case of the image blur compensating process B) (in step S31).

The setting of the electric current value in step S31 changes the lately-set value on the electric current which should be flowed to the coils in the case of the image blur compensating process B. This enables the CCD to continue moving in the traveling direction with this set electric current value, and makes it possible to prevent an exposure from being performed at a position away from the target position. Accordingly, this makes it possible to place the CCD within the range of the target value.

Furthermore, in the case of the servo control illustrated in FIG. 17, the flag is checked on. In the case where the flag is 1 (one), the servo control is performed in a period of 0.00025 seconds. In the case where the flag is 0 (zero), the servo control is performed in a period of 0.00075 seconds. During the servo control in which an interruption of the image blur compensating process takes place, neither an interruption of the flash lighting nor an interruption of the closing of the mechanical shutter is allowed to take place. If none of these interruptions are allowed to take place when the interruptions need to be performed, the flash lighting and the exposure are out of timing. As a result, for example, an excessively bright image is taken. For the purpose of avoiding this problem, the servo control for the image blur compensation is designed to be temporarily stopped immediate before the flash lighting and the closing of the mechanical shutter are performed. Consequently, the flash lighting and the closing of the mechanical shutter are designed to be performed at their respective intended timings. This makes it possible to take a picture which does not adversely affect the image.

Moreover, in a case where a time interval F between the completion of the process for starting the flash lighting and the onset of the process for finishing the flash lighting is shorter than 2×T, it is likely that the timing at which to perform the process for finishing the flash lighting may be equal to the timing at which to perform the image blur compensating process (it takes 0.0001 seconds to perform the process.) For this reason, the timing chart for the exposure is as illustrated in FIG. 25, instead of FIG. 21.

Figure 25:
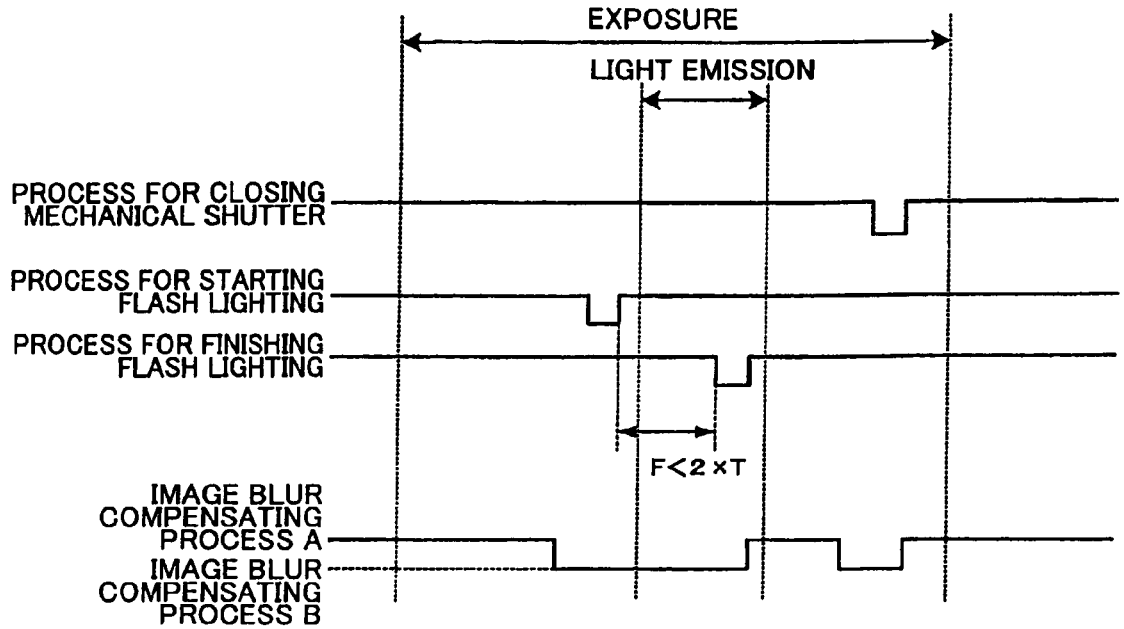
FIG. 25 is a timing chart of steps which are carried out while performing an exposure.

As illustrated in FIG. 25, the flag is re-set at 1 (one) at the end of the process for finishing the flash lighting, instead of at the end of the process for starting the flash lighting. As a result, the result of the determination on whether or not the flag is 1 (one) in step S20 illustrated in FIG. 17 is always NO while the flash lighting is being performed. Accordingly, it takes 0.000005 seconds to perform the compensation process.

Figure 26:
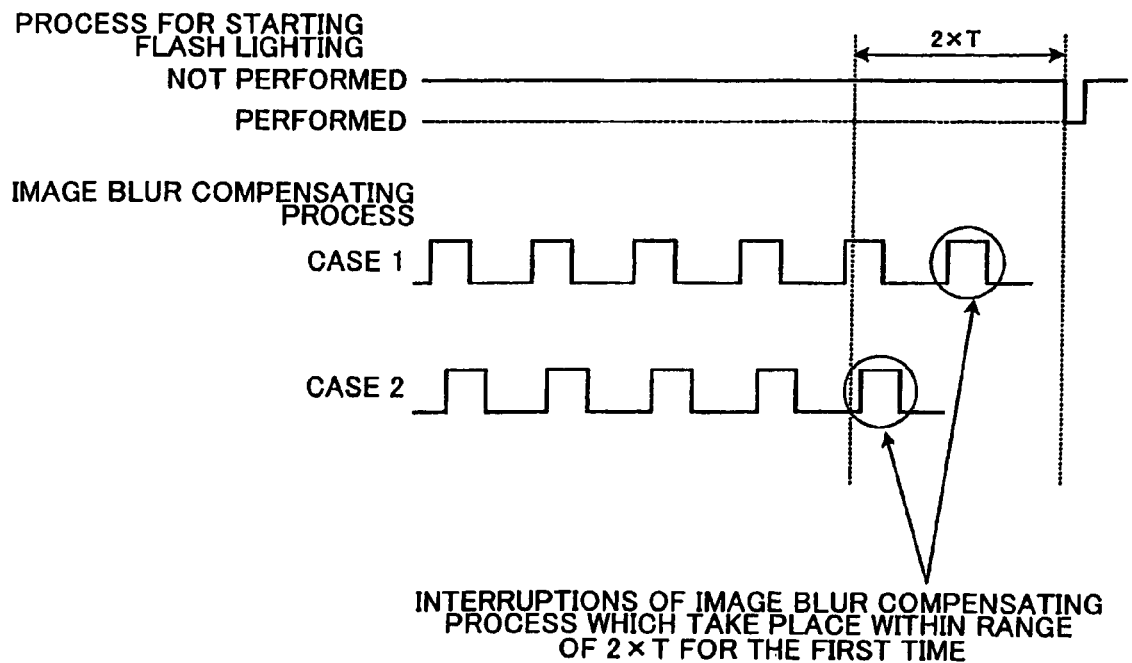
FIG. 26 is a diagram for explaining why 2×T is used as a reference in "a value on a time read by every countdown timer>2×T."

FIG. 26 illustrates the reason why 2×T is used as a reference in the determination on whether or not a value on a time read by every countdown timer>2×T in step S21 of FIG. 17. As illustrated in FIG. 26, Case 1 is a case where the result of the determination on whether or not the value on the time counted by every countdown timer is larger than 2×T is turned to NO at latest. Case 2 is a case where the result of the determination on whether or not the value on the time counted by every countdown timer is larger than 2×T is turned to NO at earliest. In both cases, it takes 0.000005 seconds to perform the process for starting the flash lighting in the flowchart illustrated in FIG. 17. The multiplier "2" by which the period T is multiplied is a minimum multiplier which makes it take 0.000005 seconds to perform the process for staring the flash lighting in accordance with the flowchart illustrated in FIG. 17.

It should be noted that "every countdown timer" included in the determination in step S21 means that at least one countdown timer is in operation out of the three countdown timers in the foregoing example.

Figure 27:
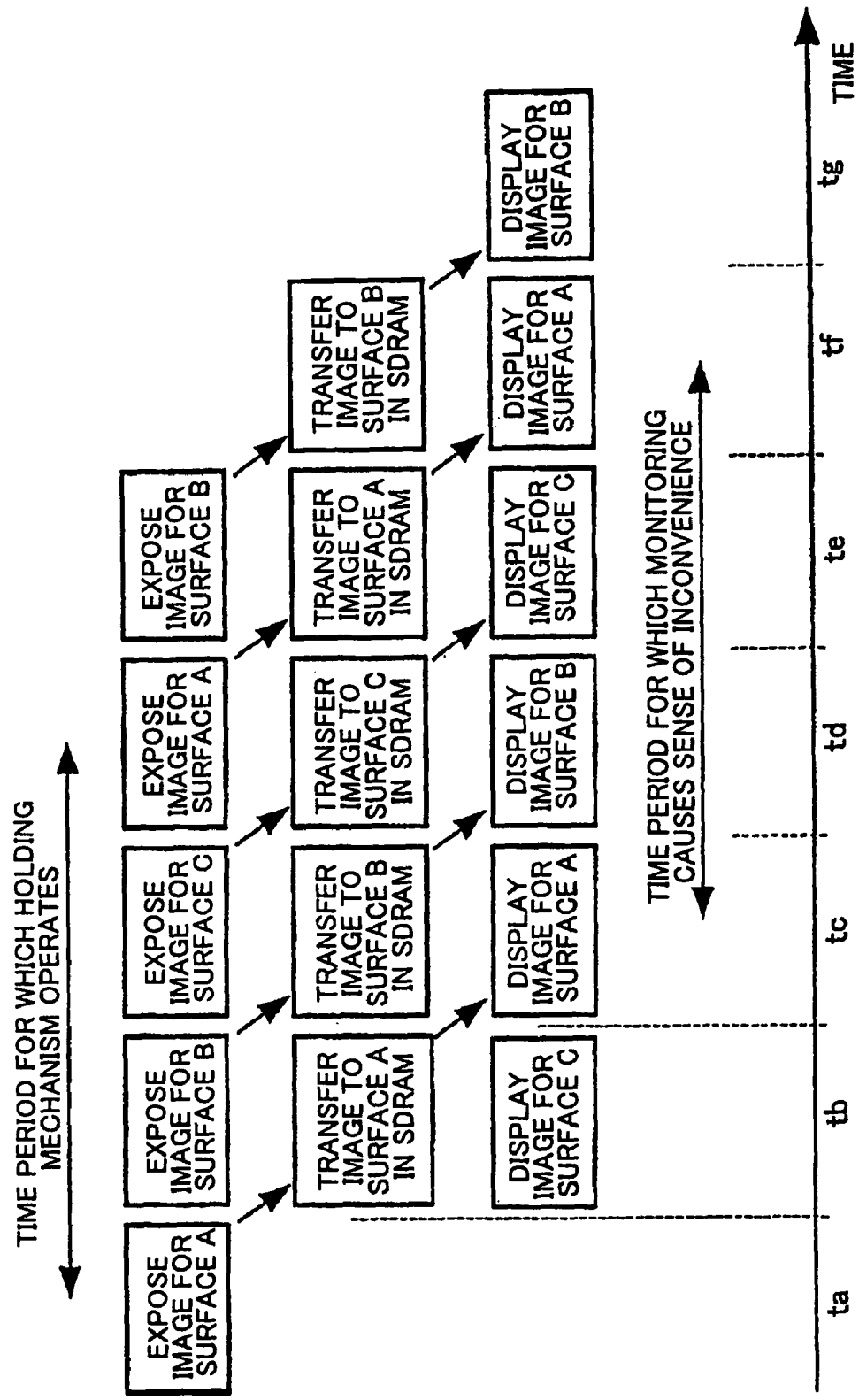
FIG. 27 is a diagram illustrating a flow of monitoring images.
Figure 28:
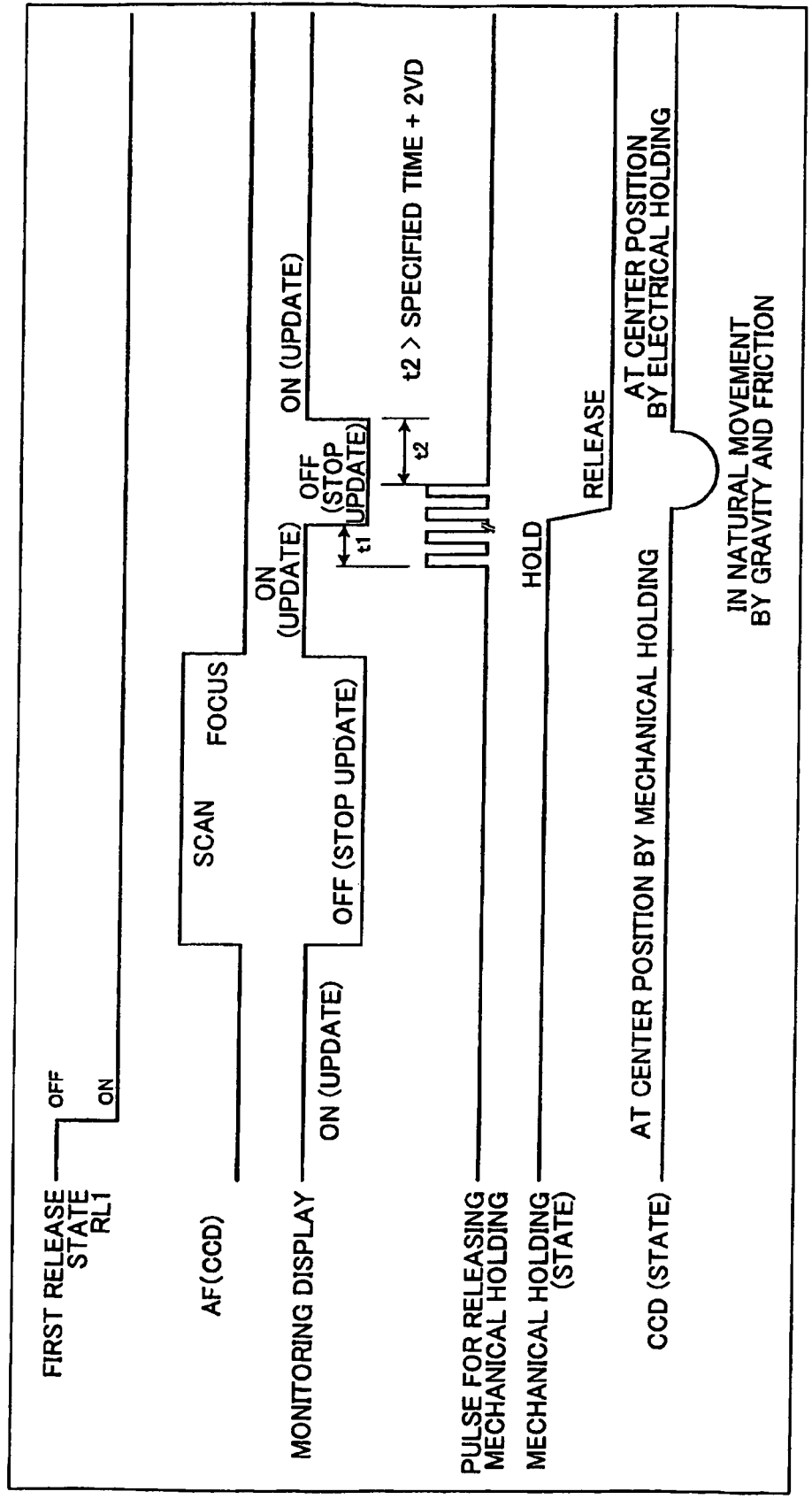
FIG. 28 is a timing chart illustrating signals which are under a first release state.

FIGS. 27 and 28 illustrate a flow of monitoring images according to the present embodiment. For example, three surfaces A, B and C in the SDRAM 103 are assigned as destinations to which the CCD 101 illustrated in FIG. 2 captures images. Images are repeatedly captured to Surfaces A, B and C in this sequence. An image which has been captured most recently is used as an image to be displayed. For this reason, while an image is being transferred to Surface B, an image on Surface A is used as the image to be displayed (simultaneously, the CCD 101 exposes an image for Surface C). The next exposure starts to be performed, and images to be displayed are switched, at the same timing as this image starts to be transferred. There is time lag between a displayed image and an actual scene in this manner.

Starting from a time when the image blur compensating device starts to be released from the mechanical holding, as illustrated in a timing chart of FIG. 28, the monitoring display is for example turned OFF (is stopped from updating), and the next image is left displayed time length t1 after pulses for releasing the mechanical holding are outputted. This makes it possible to hold the image still neither too much nor too less. This method of holding an image still causes an image on Surface A to be displayed continuously without switching display images in a case where the image on Surface A is currently used, and prohibits an exposed image from being transferred from the CCD 101 to the SDRAM 103.

Specifically, when the release is started at time to in FIG. 27, an image on Surface C to be displayed at time tb is left displayed, and an image on Surface A is prohibited from being transferred to the display device from Surface B which is exposed and from the SDRAM 103.

Afterward, starting from a time (time td) when the release of the mechanical holding is completed, the monitoring display is turned ON (updated) time length t2 after the pulses for releasing the mechanical holding is stopped as illustrated in the timing chart of FIG. 28, and an image on Surface B which is exposed at ensuing time te is permitted to be transferred to the SDRAM 103. The monitoring is permitted to be updated in order that the image on Surface B which is transferred to the SDRAM 103 at time tf in FIG. 27 is displayable on the display device (LCD monitor 1') at time tg.

This enables the conversion to be made from the mechanical holding to the electrical holding without causing a sense of inconvenience due to an image blur, an image shift or the like on image display when the mechanical holding is released.

In addition, as another example, when the release is started at time ta in FIG. 27, the screen of the display device (LCD monitor 1') is partially or completely covered with a black screen OSD which partially or fully extends in the screen of the display device. This enables the conversion to be made from the mechanical holding to the electrical holding without changing the process for transferring an image from the CCD 101 to the SDRAM 103 or the process for transferring an image from the SDRAM 103 to the display device as described above, and without causing a sense of inconvenience due to an image blur or the like on the image display, when the mechanical holding is released.

As described in the foregoing, therefore, the present embodiment of the invention brings about an effect of making it possible to smoothly convert the compensating device which compensates the image blur between the mechanical holding and the electrical holding without the image blur, image shift or the like making a user of the imaging apparatus feel a sense of inconvenience.

The present application is based on and claims priority from Japanese Application Number 2006-189024, filed Jul. 10, 2006, and Japanese Application Number 2007-006982, filed Jan. 16, 2007, the disclosures of which are hereby incorporated by reference herein in their entirety.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present description or during the prosecution of the application, which examples are to be construed as non-exclusive. For example, in the present disclosure, the term "preferably", "preferred" or the like is non-exclusive and means "preferably", but not limited to.

INDUSTRIAL APPLICABILITY

The imaging apparatus and imaging method according to the present invention makes it possible to convert the compensating device from the mechanical holding mode to the electrical holding mode without causing a sense of inconvenience due to an image blur, an image shift or the like. As a result, the imaging apparatus and imaging method according to the present invention are effective as an imaging apparatus and imaging method each including the compensating device which compensates the image blur or the like caused by camera shake in taking a picture.

The invention claimed is:

1. An imaging apparatus, comprising:
   an imaging device that captures an image;
   a display device that displays the image captured by the imaging device;
   a shake detecting device that detects shake applied to the imaging apparatus;
   a compensating device that compensates an image blur caused by the shake;
   a driving device that drives the compensating device;
   a mechanical holding device that mechanically holds the compensating device; and
   a controller that mechanically holds the compensating device by the mechanical holding device while no operation for compensation of the image blur is performed, and that electrically holds the compensating device by the driving device with a state in which the compensating device is drivable by the driving device while the operation for the compensation of the image blur is performed, and that changes control of displaying of the image by the display device when a state in which the compensating device is mechanically held by the mechanical holding device as a mechanically holding state is converted to a state in which the compensating device is electrically held by the driving device as an electrical holding state by leaving displayed an image for a predetermined length of time after a pulse for releasing the mechanically holding state is output.

2. The imaging apparatus according to claim 1, wherein the controller is configured to temporarily stop updating operation of the image by the display device when the mechanically holding state is converted to the electrical holding state in which the operation for the compensation of the image blur is possible.

3. The imaging apparatus according to claim 2, wherein timing at which the controller causes the display device to stop the updating operation of the image, when the mechanically holding state is converted to the electrical holding state in which the operation for the compensation of the image blur is possible, is a point at which a predetermined length of time has passed after control for releasing the mechanical holding state is started.

4. The imaging apparatus according to claim 2, wherein timing at which the controller causes the display device to resume the updating operation of the image after stopping the updating operation of the image, when the mechanically holding state is converted to the electrical holding state in which the operation for the compensation of the image blur is possible, is a point at which a predetermined length of time has passed after control for releasing the mechanical holding state is completed.

5. The imaging apparatus according to any one of claims 1 to 4, wherein the controller is configured to release holding of the compensating device by the mechanical holding device when a power supply to the imaging apparatus is turned on.

6. The imaging apparatus according to any one of claims 1 to 4, wherein the controller is configured to release holding of the compensating device by the mechanical holding device when a first release operation starts to be performed.

7. The imaging apparatus according to any one of claims 1 to 4, wherein the holding of the compensating device by the mechanical holding device is released when a second release operation starts to be performed.

8. The imaging apparatus according to claim 1, wherein the controller is configured to cover the displaying of the image by the display device with on-screen display (OSD) when the mechanically holding state is converted to the electrical holding state in which the operation for the compensation of the image blur is possible.

9. An imaging method, comprising:
    preparing an imaging device that captures an image;
    preparing a display device that displays the image captured by the imaging device;
    preparing a shake detecting device that detects shake applied externally;
    preparing a compensating device that compensates an image blur caused by the shake;
    preparing a driving device that drives the compensating device;
    preparing a mechanical holding device that mechanically holds the compensating device;
    mechanically holding the compensating device by the mechanical holding device while no operation for compensation of the image blur is performed;
    electrically holding the compensating device by the driving device with a state in which the compensating device is drivable by the driving device while the operation for the compensation of the image blur is performed; and
    changing control of displaying of the image by the display device when a state in which the compensating device is mechanically held by the mechanical holding device as a mechanically holding state is converted to a state in which the compensating device is electrically held by the driving device as an electrical holding state by leaving displayed an image for a predetermined length of time after a pulse for releasing the mechanically holding state is output.

10. The imaging method according to claim 9, further comprising temporarily stopping updating operation of the image by the display device when the mechanically holding state is converted to the electrical holding state in which the operation for the compensation of the image blur is possible.

11. The imaging method according to claim 10, wherein timing at which to cause the display device to stop the updating operation of the image, when the mechanically holding state is converted to the electrical holding state in which the operation for the compensation of the image blur is possible, is a point at which a predetermined length of time has passed after control for releasing the mechanical holding state is started.

12. The imaging method according to claim 10, wherein timing at which to cause the display device to resume the updating operation of the image after stopping the updating operation of the image, when the mechanically holding state is converted to the electrical holding state in which the operation for the compensation of the image blur is possible, is a point at which a predetermined length of time has passed after control for releasing the mechanical holding state is completed.

13. The imaging method according to any one of claims 9 to 12, further comprising releasing holding of the compensating device by the mechanical holding device when a power supply to the imaging apparatus is turned on.

14. The imaging method according to any one of claims 9 to 12, further comprising releasing holding of the compensating device by the mechanical holding device when a first release operation starts to be performed.

15. The imaging method according to any one of claims 9 to 12, further comprising releasing the holding of the compensating device by the mechanical holding device when a second release operation starts to be performed.

16. The imaging method according to claim 9, further comprising covering the displaying of the image by the display device with on-screen display (OSD) when the mechanically holding state is converted to the electrical holding state in which the operation for the compensation of the image blur is possible.

17. An imaging apparatus, comprising:
    imaging means;
    display means for displaying an image from the imaging means;
    shake detecting means for detecting shake applied to the imaging apparatus;
    compensating means for compensating an image blur caused by the shake;
    driving means for driving the compensating means; and
    mechanical holding means for mechanically holding the compensating means, the imaging apparatus including an image blur compensating function which mechanically holds the compensating means while no operation for compensation of the image blur is performed, and which electrically holds the compensating means with a state in which the compensating means is drivable while the operation for the compensation of the image blur is performed, wherein the imaging apparatus comprises means for changing control of displaying by the display means when a state in which the compensating means is mechanically held as a mechanically holding state is converted to a state in which the compensating means is electrically held as an electrical holding state by leaving displayed an image for a predetermined length of time after a pulse for releasing the mechanically holding state is output.

* * * * *